US012248488B2

(12) United States Patent
Dunning et al.

(10) Patent No.: US 12,248,488 B2
(45) Date of Patent: Mar. 11, 2025

(54) DATA RECOMMENDER USING LINEAGE TO PROPAGATE VALUE INDICATORS

(71) Applicant: HEWLETT PACKARD ENTERPRISE DEVELOPMENT LP, Spring, TX (US)

(72) Inventors: Ted Dunning, Santa Clara, CA (US); Suparna Bhattacharya, Bangalore (IN); Glyn Bowden, Bristol (GB); Lin A. Nease, San Jose, CA (US); Janice M. Zdankus, San Jose, CA (US); Sonu Sudhakaran, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 18/351,355

(22) Filed: Jul. 12, 2023

(65) Prior Publication Data
US 2023/0409587 A1    Dec. 21, 2023

Related U.S. Application Data

(63) Continuation of application No. 17/843,757, filed on Jun. 17, 2022, now Pat. No. 11,907,241.

(51) Int. Cl.
*G06F 16/248* (2019.01)
*G06F 16/2455* (2019.01)
*G06F 16/25* (2019.01)
*G06F 16/28* (2019.01)

(52) U.S. Cl.
CPC ...... *G06F 16/248* (2019.01); *G06F 16/24556* (2019.01); *G06F 16/254* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 6,259,451 B1 | 7/2001 | Tesler | |
| 7,769,781 B1* | 8/2010 | Huntley | G06F 16/22 708/620 |
| 10,110,415 B2 | 10/2018 | Radivojevic et al. | |
| 10,592,508 B2 | 3/2020 | Srivastava | |
| 10,620,923 B2 | 4/2020 | Allan et al. | |

(Continued)

*Primary Examiner* — Yu Zhao
(74) *Attorney, Agent, or Firm* — Hewlett Packard Enterprise Patent Department

(57) ABSTRACT

Systems and methods provide a system that gathers information about data as it progresses through data processing pipelines of data analysis projects. The data analytics system derives value indicators and implicit metadata from the data processing pipelines. For example, the data analytics system may derive value indicators and implicit metadata from data-related products themselves, semantic analysis of the code/processing steps used to process the data-related products, the structure of data processing pipelines, and human behavior related to production and usage of data-related products. Once a new data analysis project is initiated, the data analytics system gathers parameters and characteristics about the new data analysis project and references the value indicators and implicit metadata to recommend useful processing steps, datasets, and/or other data-related products for the new data analysis project.

20 Claims, 11 Drawing Sheets

(56) References Cited

U.S. PATENT DOCUMENTS

| | | | |
|---|---|---|---|
| 10,877,946 B1* | 12/2020 | Silva | G06F 16/9027 |
| 11,138,157 B2 | 10/2021 | Singh et al. | |
| 11,144,569 B2 | 10/2021 | Kannan et al. | |
| 11,205,138 B2 | 12/2021 | Shaikh et al. | |
| 11,250,065 B2 | 2/2022 | Srivastava | |
| 2003/0221171 A1 | 11/2003 | Rust et al. | |
| 2011/0066602 A1 | 3/2011 | Studer et al. | |
| 2012/0131139 A1 | 5/2012 | Siripurapu et al. | |
| 2014/0114907 A1 | 4/2014 | Kozina et al. | |
| 2014/0279979 A1 | 9/2014 | Yost et al. | |
| 2015/0127357 A1 | 5/2015 | Yuan et al. | |
| 2016/0328406 A1 | 11/2016 | Convertino et al. | |
| 2018/0089291 A1* | 3/2018 | Vankamamidi | G06Q 10/0637 |
| 2018/0113865 A1* | 4/2018 | Najork | G06F 16/951 |
| 2019/0095458 A1 | 3/2019 | Saradhi et al. | |
| 2019/0182382 A1* | 6/2019 | Mazza | H04M 3/527 |
| 2020/0097845 A1 | 3/2020 | Shaikh et al. | |
| 2021/0191957 A1 | 6/2021 | Swamy et al. | |
| 2021/0349901 A1 | 11/2021 | Potharaju et al. | |
| 2023/0289649 A1* | 9/2023 | Chandrahasan | G06N 20/10 |

* cited by examiner

DATA RECOMMENDER USING LINEAGE TO PROPAGATE VALUE INDICATORS

CROSS-REFERENCE TO RELATED APPLICATIONS

This application is a continuation of and claims the benefit of U.S. patent application Ser. No. 17/843,757 filed on Jun. 17, 2022, which is hereby incorporated herein by reference in its entirety for all purposes.

BACKGROUND

In order to extract valuable insight from data, one may analyze the data using a data processing pipeline. The data processing pipeline may include a series of processing steps that transform data (as used herein, data may generally refer to various types of data-related products such as raw data, datasets, databases, analytical models derived from data, dashboards displaying one or more of the foregoing data-related products, etc.). In other words, through a series of processing steps, the data processing pipeline may iteratively transform upstream/ancestor data-related products (e.g., raw data, datasets, a database, etc.) into downstream/descendant data-related products (e.g., new datasets derived from upstream data-related products, analytical models derived from upstream data-related products, dashboards displaying one or more of the foregoing data-related products, etc.). For example, utilizing a first processing step, the data processing pipeline may transform a first data-related product (e.g., a raw data source) into a second data-related product (e.g., a dataset derived from the raw data source). Utilizing a second processing step, the data processing pipeline may transform the second data-related product into a third data-related product (e.g., an analytical model derived from the dataset), and so on (here the third data-related product may be referred to as a "descendent" of the first and second data-related products; conversely the first and second data-related products may be referred to as ancestors of the third data-related product). In this way, the data processing pipeline can transform data as it progress through the data processing pipeline.

In practical applications, the size and amount of data useful to analyze may be enormous. Not only are individual datasets very large, but there is a multitude of datasets available, which can be an organizational and logistical challenge. Theoretically, care can be taken to neatly organize and label new data. However, in reality, compliance with such regimes is hit or miss. As a result, data scientists are in high demand in the data analytics field. These data scientists, among other responsibilities, become domain experts in certain fields and accumulate experiential knowledge about the relevant data available (e.g., both raw datasets/data sources and other data-related products that have been transformed for or by prior analyses). For example, a data scientist who is a domain expert in handwriting analysis may understand characteristic differences between the MNIST dataset and the SVHN dataset and which one is best used for certain analysis.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
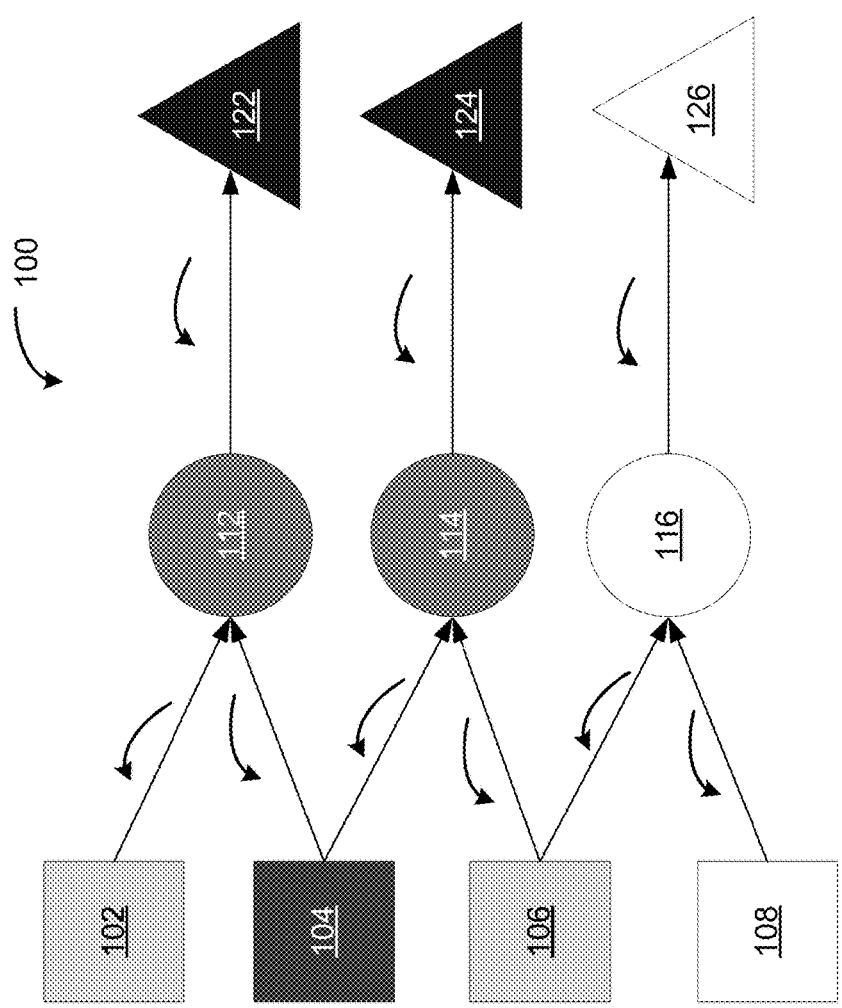
FIG. 1 depicts an example data lineage representation, in accordance with various examples of the presently disclosed technology.

The figures are not exhaustive and do not limit the present disclosure to the precise form disclosed.

DETAILED DESCRIPTION

Although hiring data scientists to wade through large amounts of data is a viable option for some data analysis projects, the sheer volume and variety of potential analyses can overwhelm the budget, timeline, and capabilities available for most organizations. Without universal knowledge of all activity in a domain, even a deeply experienced data scientist cannot be aware of every available data-related product and every past analysis done. While true globally, this is often true within the scope of an organization, as well. Many organizations have encountered the inefficient duplication of painstakingly gathering the data for a dataset only to later find out that another department or business unit had already pulled together the same dataset for a prior analysis project.

Another difficulty in relying on data scientists and their accumulated knowledge is turnover. Often, many of the most valuable insights useful in selecting data for analysis are not written down or commonly known. Rather, the practical experience and tenure of the data scientist provide them with insights that can be used to find highly relevant data. For example, a long tenured data scientist may be able to find data from different projects undertaken by different departments years earlier, whereas a newer hire data scientist may not even be aware that such data exists.

Data consumers (e.g., business users) can derive substantial value from data. While much of that value comes from an initial analysis, secondary uses of data are an underutilized way to increase value. However, discovering secondary uses for data can be challenging due to a scarcity of documentation (i.e., explicit metadata) and a lack of information delineating potential secondary uses for data. Even automated systems that attempt to recommend or select datasets fall short because the explicit metadata they rely on are not universally, or sometimes even commonly, applied to the data. Blind spots and poor recommendations are often the norm when using automated systems to recommend practically useful datasets. The lack of explicit metadata in data processing pipelines makes it difficult for data consumers and existing automated systems to mine data for secondary uses. As a result, many valuable uses for existing datasets and other dataset-related products remain unrealized.

In an example consistent with this disclosure, a data analytics system gathers information from previous data analysis projects/data processing pipelines and automatically recommends processing steps, datasets, and/or other data-related products that are most likely to be useful in conducting a data scientist or other data consumer's target data analysis project.

As will be described in greater detail below, the data analytics system gathers information about data as it progresses through data processing pipelines of previous data analysis projects. The data analytics system derives value indicators and implicit metadata from the data processing pipelines. For example, the data analytics system may derive value indicators and implicit metadata from data-related products themselves, semantic analysis of the code/processing steps used to process the data-related products, the structure of data processing pipelines, and human behavior related to production and usage of data-related products. Once a new data analysis project is initiated, the data analytics system gathers parameters and characteristics about the new data analysis project and references the value indicators and implicit metadata to recommend useful processing steps, datasets, and/or other data-related products for the new data analysis project.

Examples may derive value indicators using valuation algorithms that quantify a level of value for a given data-related product or processing step based on perceived human behavior relating to usage of the given data-related product/processing step (as used herein, a value indicator may refer to a quantifiable measurement of value for a data-related product or processing step based on perceived human behavior relating to usage of the given data-related product/processing step). For instance, examples may utilize a simple valuation algorithm that quantifies a level of value for analytical models (i.e., examples of data-related products) based on how long humans have deployed them in production environments. Using this simple valuation algorithm, examples may attribute a value of, e.g., v=3, to an analytical model that has been deployed in production for three years, and a value of, e.g., v=2, to an analytical model that has been deployed in production for two years. In various instances, examples may utilize more complex valuation algorithms which quantify, to a common numerical scale, two or more categories of human behavioral actions relating to the usage of data-related products or processing steps. For instance, examples may utilize a more complex valuation algorithm to quantify, according to a common numerical scale, a level of value for analytical models based on any one or combination of the following factors: (a) a duration of time that humans/users have deployed the analytical models in production; (b) a number of independent users who have deployed the analytical models into production; and (c) quality/accuracy scores attributed to the analytical models (these quality/accuracy scores may be attributed to the given analytical model by humans, artificial intelligence, etc.). As described above, examples may utilize valuation algorithms to quantify a level of value for two or more analytical models using a common numerical scale. Accordingly, examples may utilize these valuation algorithms to compare/rank relative values for multiple analytical models based on multiple categories of human behavioral actions. Such a valuation algorithm may provide an enhanced approximation of actual human value judgements.

Examples may utilize value indicators in various ways. For instance, examples may enhance data analytics systems by helping them evaluate and rank processing steps, datasets, and other data-related products in a manner that more accurately mirrors human judgment.

Examples may also utilize value indicators to derive implicit metadata from data processing pipelines. Certain examples of this implicit metadata may be referred to as metadata indicators. As will be described below, metadata indicators may represent statistically significant/interesting correspondences that examples of the presently disclosed technology identify/perceive across metadata lineages. Examples may utilize derived metadata indicators to identify "high value influencing metadata characteristics." As used herein, a "high value influencing metadata characteristic" may refer to (a) a metadata characteristic for an upstream/ancestor data-related product or processing step likely to increase/influence the value of a downstream/descendant data-related product derived from the upstream/ancestor data-related product/processing step having the "high value influencing metadata characteristic"; and/or (b) a metadata characteristic for a given data-related product likely to increase/influence the value of the given data-related product itself. As indicated by metadata indicators, these "high value influencing metadata characteristics" may be the metadata characteristics that arise with unusual/statistically significant frequency across the metadata lineages of "highly valued" data-related products. Examples may enhance data analytics systems by identifying and recommending novel combinations of existing data-related products and processing steps—having these "high value influencing metadata characteristics"—for producing new highly valued data-related products.

As a simplified analogy to illustrate the concept, the top 100 most "highly valued" online cake recipes in the US may all include the word "cake" in the title of the recipe (here, examples may judge/quantify value according to value indicators, e.g., 5 star ratings, social media shares, etc.). However many more "lowly valued" online cake recipes may include the word "cake" as well. As examples of the presently disclosed technology appreciate, having the word "cake" in the recipe title may not be a high value influencing (metadata) characteristic for a cake recipe. However, examples may discover that 18 out of the top 100 most "highly valued" online cake recipes have the word "Grandma" in the recipe title. Conversely, the word "Grandma" may appear in the title of "lowly valued" online cake recipes far less frequently. Accordingly, the use of the word "Grandma" in the title for an online cake recipe may be a "high value influencing (metadata) characteristic" because it arises with unusual/statistically significant frequency among the top 100 most "highly valued" online cake recipes. Accordingly, examples may recommend that a new/prospective online cake recipe include the word "Grandma" in the title.

Examples may derive metadata indicators by (1) using metadata extraction and characterization algorithms to extract and characterize (explicit or implicit) metadata from high value producing data processing pipelines (i.e., data processing pipelines that have produced highly valued data-related products as quantified by value indicators); (2) constructing metadata lineage representations for the high value producing data processing pipelines, the metadata lineage representations comprising lineal associations between extracted metadata characteristics for the data-related products and processing steps of the high value producing data processing pipelines; and (3) utilizing the constructed metadata lineage representations to perceive statistically interesting/significant correspondences (i.e., the metadata indicators) across the metadata for data-related products and processing steps of the high value producing data processing pipelines. As described above, examples may use derived metadata indicators to identify and recommend high value influencing metadata characteristics for upstream/ancestor data-related products and processing steps likely to produce useful downstream/descendant data-related products for a given data consumer/data scientist's target data analysis project.

In various instances, examples can derive metadata indicators by "propagating" value indicators through metadata lineage representations for highly valued data-related products. In some instances, examples may accomplish such value propagation by characterizing value indicators as metadata characteristics associated with the highly valued data-related products. Examples may then derive metadata indicators using a cross-occurrence computation that effectively results in propagation of value indicators through the metadata lineages of the highly valued data-related products. As described above, these computed/derived metadata indicators may represent statistically interesting/significant correspondences perceived across the metadata lineages of data processing pipelines that have consistently led to high value downstream data-related products.

In various instances, examples may propagate value indicators through a data lineage representation for multiple downstream/descendant data-related products. For a given downstream/descendant data-related product, the data lineage representation may comprise lineal associations between the given downstream/descendant data-related product and its ancestors datasets and ancestor processing steps (i.e., the datasets and processing steps used to produce the downstream/descendant data-related product). In many cases, multiple descendant/downstream data-related products—which are not ancestors/descendants of each other—may share ancestors. Examples may propagate value indicators through the data lineage representation by: (1) attributing, to each ancestor dataset and ancestor processing step of a given downstream/descendant data-related product, the value indicator for the given downstream/descendant data-related product; and (2) aggregating, for a given ancestor dataset or ancestor processing step, one or more of the value indicators attributed to the given ancestor dataset or ancestor processing step (as described above, in certain cases multiple downstream/descendant data-related products may share an ancestor). In certain instances, examples may reduce an aggregated value indicator for a given ancestor according to a cost to realize the aggregated value indicator for the given ancestor. Similarly, examples may reduce an aggregated value indicator for the given ancestor according to a level of remoteness between the given ancestor and its one or more associated downstream/descendant data-related products. Here, the level of remoteness between a given ancestor and a given downstream/descendant data-related product may be measured by the number of ancestors between the given ancestor and the given downstream/descendant data-related product along the lineal representation for the given ancestor and given downstream/descendant data-related product (e.g., mother vs. grandmother vs. great grandmother, etc.). Examples may utilize various value propagation algorithms to perform/compute the attributions, aggregations, and reductions described above.

By propagating value indicators through data lineage representations, examples may assign transitive value credit to the (upstream/ancestor) data-related products and processing steps that have been used to produce highly valued (downstream/descendant) data-related products. Accordingly, examples may enhance data analytics systems by enabling them to rank data-related products and processing steps according to perceived value (as described above, this perceived value is based on actual human behavior, and thus may be commensurate with actual human value judgements). Such rankings may be used to inform recommendations, for e.g., novel combinations of datasets and processing steps for producing new data-related products likely to be useful/valuable for a data consumer/scientist's target data analysis project.

Examples of the presently disclosed technology may provide numerous advantages over existing automated data recommendation technologies. For instance, examples of the presently disclosed technology do not rely on data producers and processors creating explicit metadata related to potential uses for their data. Instead, examples provide data analytics systems that analyze human behavior and combine data lineages with semantic analysis of data processing steps to derive their own value indicators and implicit metadata (e.g., metadata indicators) that can drive intelligent recommendations. As another example, examples of the presently disclosed technology take human judgment into account when making recommendations. By leveraging value indicators, examples may provide recommendations commensurate with actual human value judgments. As a third example, examples of the presently disclosed technology can expand data processing pipelines by recommending novel data-related products (i.e., data-related products not yet in existence). In other words, examples can recommend not only existing data-related products, but processing steps for transforming existing data-related products into something entirely new. As will be described below, these novel/new data-related products may be intelligently tailored for a data consumer's target data analysis project.

The benefits provided by examples of the presently disclosed technology can extend well beyond recommending data-related products and processing steps. For example, a common problem in many enterprises is that valuable data (e.g., datasets and other data-related products that can be used to produce new data-related products likely to be valued by a data community) is not even shared in the first place because producers lack time and expertise to (1) make the data useful, or (2) ensure negative consequences associated with data's use are mitigated. Relatedly, even when relevant data is identified by a data consumer, it may be unclear how to access it and/or make use of it. It can also be a significant challenge to ensure that insights derived from data are trustworthy (unbiased, robust, explainable, etc.). Examples of the presently disclosed technology can free data producers and consumers from these burdens by providing data analytics systems that leverage the collective expertise of a data community to automatically recommend suitable trustworthy datasets and processing steps for utilizing them. These techniques may also be extended to provide reverse recommendations to data producers. For instance, examples may suggest suitable consuming tasks/processing steps that producers of similar data have allowed, along with an option to instantiate those consuming tasks/processing steps in a verifiable trusted environment. Examples may then facilitate sharing of the resulting outputs.

Additionally, it should be understood that while recommendations made by examples of the presently disclosed technology may, in some examples, be based on recommendation indicators or co-occurrences of certain metadata across datasets, in some other examples, the recommendation may be based on other forms of analysis, including deep learning methods. For example, extracted metadata and value indicators/credits may be input into a deep learning model, such as a deep learning recommendation model (DLRM) or Wide & Deep. In such examples, recommendations may be generated based on additional factors that are not captured in the indicators and co-occurrences.

FIG. 1 depicts an example data lineage representation 100, in accordance with various examples of the presently disclosed technology. Data lineage representation 100 represents the data lineages for downstream data-related products 122-126, which includes the upstream data-related products (i.e., upstream data-related products 102-108) and processing steps (i.e., processing steps 112-116) from which they are derived.

Upstream data-related products 102-108 may be various types of data-related products such as raw data sources, datasets, databases, analytical models derived from data, dashboards for displaying one or more of the foregoing data-related products, etc. Processing steps 112-116 may be various types of processing steps (e.g., software programs/algorithms, artificial intelligence or machine learning models that operationalize datasets into analytical models, etc.) which transform upstream data-related products into new, downstream data-related products (e.g., new datasets derived from upstream data-related products, analytical models derived from upstream data-related products, dashboards for displaying one or more of the foregoing data-related products, etc.).

As depicted, processing step 112 receives upstream data-related products 102 and 104 as inputs, and transforms them into downstream data-related product 122. Accordingly, upstream data-related products 102 and 104 may be referred to as "ancestor" data-related products for downstream data-related product 122. Similarly, processing step 112 may be referred to as an "ancestor" processing step for downstream data-related product 122.

Processing step 114 receives upstream data-related products 104 and 106 as inputs, and transforms them into downstream data-related product 124. Accordingly, upstream data-related products 104 and 106 may be referred to as "ancestor" data-related products for downstream data-related product 124. Similarly, processing step 114 may be referred to as an "ancestor" processing step for downstream data-related product 124. Here, it may be noted that downstream data-related products 122 and 124 share upstream data-related product 104 as an ancestor.

Processing step 116 receives upstream data-related products 106 and 108 as inputs and transforms them into downstream data-related product 126. Accordingly, upstream data-related products 106 and 108 may be referred to as "ancestor" data-related products for downstream data-related product 126. Similarly, processing step 116 may be referred to as an "ancestor" processing step for downstream data-related product 126. Here, it may be noted that downstream data-related products 124 and 126 share upstream data-related product 106 as an ancestor.

In the specific example of FIG. 1, downstream data-related products 122 and 124 are analytical models deployed in production environments. By contrast, downstream data-related product 126 is a analytical model which has never been deployed into production.

FIG. 1 may illustrate a high-level conceptual overview of how examples of the presently disclosed technology can propagate value indicators through data lineage representations in order to discover/identify high value upstream data-related products and processing steps for producing new and useful (downstream) data-related products. As will be described in greater detail in conjunction with subsequent figures, a similar process may be used to propagate value indicators through metadata lineage representations in order to discover "high value influencing" metadata characteristics.

As described above, examples of the presently disclosed technology view data and its processing both in terms of objective properties (i.e. the objective properties of the data and code used to process it), but also as evidence of human judgments and human actions (examples can quantify these human judgments and behavioral actions using the value indicators/valuation algorithms described above). This dual view allows examples to provide data analytics systems that examine the objective properties of data and processing steps to predict future human judgments and actions relative to data. Thus, these data analytics systems can examine data lineages (including the data-related products and processing steps comprising data lineages) as they presently exist, but also as they plausibly could exist. Accordingly, examples can provide enhanced data analytics systems that predict and recommend (upstream) data-related products and processing steps likely to produce useful/valuable (downstream) data-related products for a data consumer's data analysis project. Moreover, these data analytics systems can make these predictions without having to understand what human judgments really mean. In other words, the data analytics systems need not know what data quality means to understand that a data community (e.g., data producers, data engineers/scientists, data consumers, etc.) behaves as if a given dataset or other data-related product is of high quality.

Referring again to FIG. 1, downstream data-related products 122 and 124 represent analytical models deployed by data consumers/business users in production environments (for example downstream data-related products 122 and 124 may be analytical models used by local governments to predict the spread of vector borne disease in cities). By contrast, downstream data-related product 126 represents an analytical model which has never been deployed into production (for example, downstream data-related product 126 may represent an analytical model for predicting the spread of vector borne disease in cities which has never been operationalized). As described above, examples can use valuation algorithms to derive/compute value indicators for downstream data-related products 122-126. These value indicators may represent quantifiable measurements of value for downstream data-related products 122-126 based on perceived human behavior relating to the usage of downstream data-related products 122-126. For instance, examples may utilize a simple valuation algorithm that quantifies a value measurement for a given downstream data-related product based on a duration of time that humans/data consumers have deployed the given downstream data-related product in production. Here, downstream data-related products 122 and 124 may each have been deployed in production for one year Accordingly, examples may use the simple valuation algorithm to derive a value measurement for downstream data-related products 122 and 124 of e.g., v=1. By contrast, because downstream data-related product 126 has never been deployed in production, the simple valuation algorithm may compute a lower value measurement for downstream data-related product 126, e.g., v=0.

In response to deriving value indicators for downstream data-related products 122-126, examples may "back propagate" these value indicators through data lineage representation 100 to assign/attribute transitive value credit to the ancestor data-related products and processing steps for downstream data-related products 122-126. In this way, example may discover/identify (upstream) data-related products and processing steps most likely to produce new and useful/valuable (downstream) data-related products.

As described above, examples may propagate value indicators through data lineage representation 100 using various propagation algorithms. For instance, examples may utilize a propagation algorithm that (1) attributes, to each ancestor data-related product and ancestor processing step of a given downstream data-related product, the value indicator for the given downstream data-related product; and (2) aggregates, for a given ancestor data-related product or ancestor processing step, one or more of the value indicators attributed to the given ancestor data-related product or ancestor processing step (as depicted, in certain cases downstream data-related products 122-126 share ancestors, e.g., upstream data-related products 104 and 106). In certain instances, examples may reduce an aggregated value indicator for a given ancestor according to a cost to realize the aggregated value indicator for the given ancestor. Similarly, examples may reduce an aggregated value indicator for the given ancestor according to a level of remoteness between the given ancestor and its one or more associated downstream/descendent data-related products. Here, the level of remoteness between a given ancestor and a given downstream/descendant data-related product may be measured by the number of ancestors between the given ancestor and the given downstream/descendent data-related product (accordingly, the level of remoteness between upstream data-related product 102 and downstream data-related product 122 may be greater than the level of remoteness between processing step 112 and downstream data-related product 122). Examples may utilize various propagation algorithms to perform/compute the attributions, aggregations, and reductions described above.

As depicted in FIG. 1, examples may have performed the value propagation described above. Here, the relative shading for the upstream data-related products, processing steps, and downstream data-related products may represent the value credit examples have attributed to them As illustrated by their relative shading, in accordance with their respective value indicators, examples have attributed higher value to downstream data-related products 122 and 124 than to downstream data-related product 126. As described above, examples may derive the value indicators for downstream data-related products 122-126 using a valuation algorithm which computes a value measurement based on the duration humans/data consumers have deployed a given downstream data-related product in production.

As depicted in the example of FIG. 1, by back-propagating the value indicators for downstream data-related products 122-126 through data lineage representation 100, examples have assigned transitive value credit to the processing steps and upstream data-related product used to produce downstream data-related products 122 and 124. In this way, examples have attributed value to the upstream data-related products and processing steps that downstream data-related products 122 and 124 are derived from.

Resulting from such propagation, examples have attributed transitive value credit to processing steps 112-116. As indicated by their relative shading, examples have attributed higher value credit to processing steps 112 and 114 than to processing step 116. This is because only processing steps 112 and 114 have produced analytical models deployed in production (i.e., downstream data-related products 122 and 124). In other words, through value propagation, examples have attributed the higher value indicators of downstream data-related products 122 and 124 (e.g., v=1) to processing steps 112 and 114 respectively. By contrast, examples have attributed the lower value indicator of downstream data-related product 126 (i.e., v=0) to processing step 116. Here, the lighter shading of processing steps 112 and 114 as compared to downstream data-related products 122 and 124 may represent a discounting in value credit for processing steps 112 and 114 because they are farther upstream in the data flow/data processing pipeline (in other words, they are farther removed from the direct value indicator of in-production deployment).

Extending value propagation to the upstream data-related product level, examples have also attributed (and in the cases of upstream data-related products 104 and 106, aggregated) transitive value credit for upstream data-related products 102-108. As depicted by relative shading, examples have aggregated the highest value for upstream data-related product 104 because it was used to derive two in-production analytical models (i.e., downstream data-related products 122 and 124). In other words, examples have aggregated, for upstream data-related product 104, the value indicators for both of upstream data-related products 104's in production descendants (i.e., downstream data-related products 122 and 124). Accordingly, the aggregated value for input data-related information 104 may be v=2 (i.e., v=1+v=1), minus some level of discounting based on various factors such as a cost to realize the aggregated value for upstream data-related product 104, or a level of remoteness between upstream data-related product 104 and its in-production descendants. As depicted, examples have attributed the lowest value to upstream data-related product 108 because no in-production analytical models have been derived from it.

As will be described in greater detail below, when implemented within a data analytics systems tasked with recommending potential (upstream) data-related products and processing steps for producing new and useful (downstream) data-related products, examples may identify upstream data-related product 104, and either of processing steps 112 and 114 as (upstream) data-related products and processing steps likely to produce new and useful/valuable (downstream) data-related products for e.g., a data consumers data analysis project.

Figure 2:
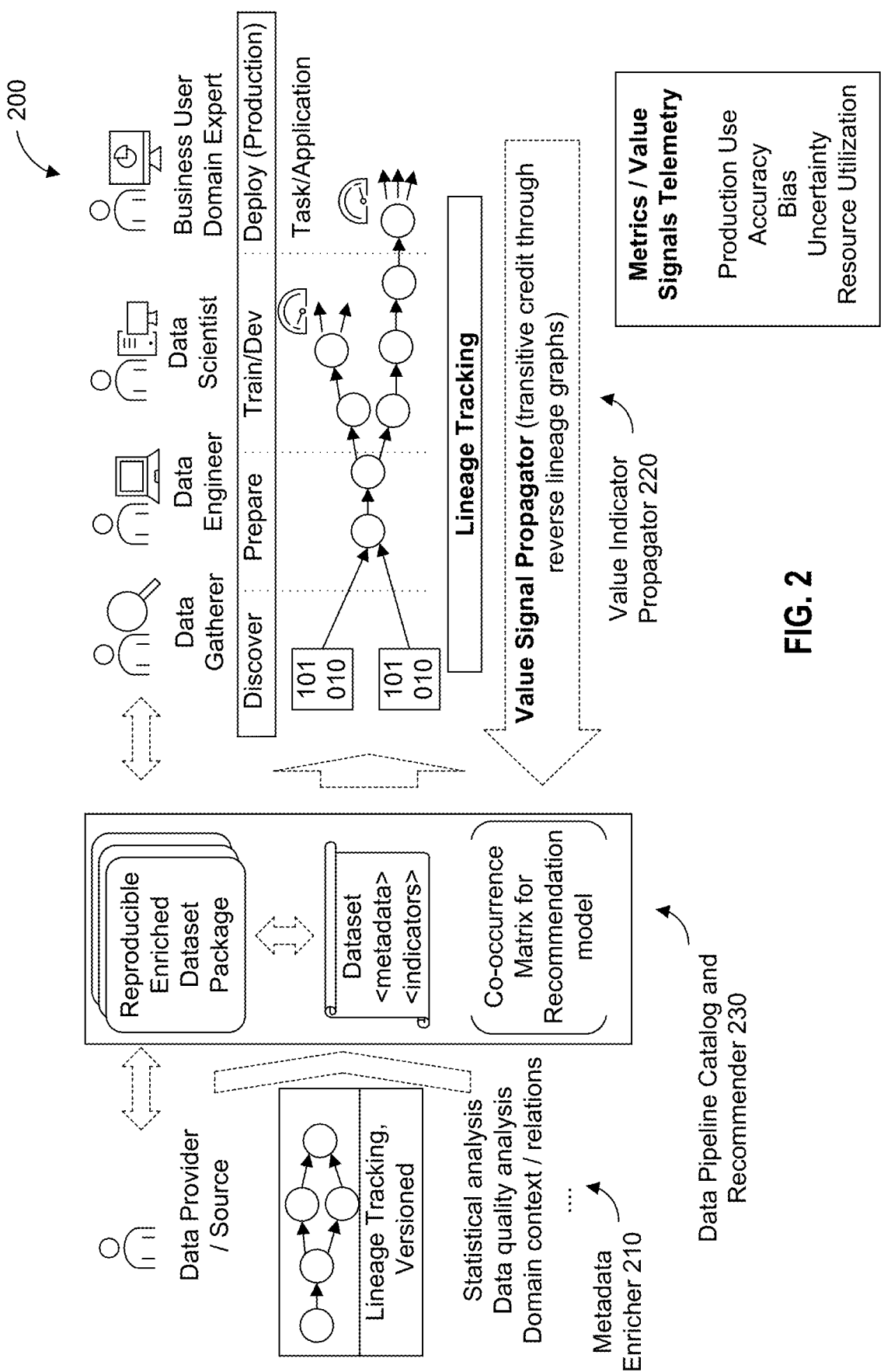
FIG. 2 depicts an example data analytics system, in accordance with various examples of the presently disclosed technology.

FIG. 2 depicts an example data analytics system 200, in accordance with various examples of the presently disclosed technology. As depicted, data analytics system 200 may be used to: (1) extract, characterize, and catalog metadata (such metadata may be implicit or explicit metadata) from data processing pipelines (such metadata extraction may include extracting data lineage information for the data processing pipelines); and (2) discover and then recommend (a) (upstream) data-related products, (b) processing steps, and/or (c) metadata characteristics for (upstream) data-related products and processing steps—likely to produce new and useful/valuable (downstream) data-related products for a data consumer's target data analysis project (as described above, examples may quantify value using value indicators). Data analytics system 200 may make these discoveries by propagating value indicators through data lineage representations (and in some cases metadata lineage representations) for data processing pipelines.

Data analytics system 200 includes a metadata enricher 210, a value indicator propagator 220, and a data pipeline catalog and recommender 230. Each sub-system and its associated functions will be described in greater detail below. It should be understood that FIG. 2 is merely an example, and that in other examples the functions described below may be performed by other systems/sub-systems.

Metadata enricher 210: Metadata enricher 210 may be a software or hardware program that extracts and characterizes metadata from data processing pipelines (including the data-related products and processing steps of the data processing pipelines).

As described above, metadata enricher 210 may extract metadata from the data-related products and processing steps of data processing pipelines using various algorithms (e.g., artificial intelligence or machine learning algorithms). For datasets and other data-related products, extracted metadata may comprise various types of metadata such as field names, data sizes, data distributions, etc. For processing steps, extracted metadata may include various types of metadata describing the processing steps such as information about which input fields are used, information about the data-related products input into the processing step, information about the data-related products produced by the processing step, contents of associated documentation for the processing step, a class of processing algorithm for the processing step, code dependencies and whether the processing step is in production, staging or QA status, unit test information, names of developers/data scientists involved in the development of the processing step, etc. As will be described below, examples may combine this extracted metadata with data lineage information (which also may be a part of the metadata extracted by metadata enricher 210 from e.g., query logs, workflow records, lineage tracking tools, etc.) for a data processing pipeline to create metadata lineage representations for the data processing pipeline. In some instances, examples may propagate extracted metadata characteristics forwards and backwards through data lineage representations and social graphs of developers associated with the data processing pipeline. As described above, by performing such propagation examples may discover (upstream) data-related products, processing steps (and even people to involve with a processing step), and/or metadata characteristics for (upstream) data-related products and processing steps—likely to produce new and useful/valuable (downstream) data-related products for a data consumer's target data analysis project.

In various examples, metadata enricher 210 may execute metadata enricher pipelines (e.g., artificial intelligence or machine learning algorithms) to intelligently characterize metadata extracted from data processing pipelines. These metadata enricher pipelines may include configurable stages providing various forms of statistical characterization for categories of extracted metadata. Metadata enricher 210 may also use metadata enricher pipelines to perform basic quality checks and trustworthy data assessments, and even to generate/derive initial value and metadata indicators.

For example, metadata enricher 210 may use metadata enricher pipelines to derive/generate "implicit metadata" (e.g., content tags, metadata characterizations, etc.) for a given data-related product, processing step, or data processing pipeline in whole, by (a) consulting tables with possible metadata values, (b) analyzing mathematical properties of metadata values, or (c) utilizing other heuristic methods.

As an example, if a given dataset has a column containing values "San Francisco", "San Jose" and "Denver", examples may determine that tags for the column should be "CITY", and "CITY-US". Individual values might have additional tags, but the column would only have tags that are common to all values in the column. Thus, even though San Francisco is a city in California, Mexico and Costa Rica (and thus might be tagged with CITY-CA-US, CITY-MX and CITY-COSTA-RICA), and Denver is a city in Colorado, Indiana and Australia, examples may use a common tag/metadata characterization for San Francisco and Denver because they are both cities in the US.

Examples may also examine numerical values when deriving/generating "implicit metadata." For instance, examples may characterize/tag a dataset column having values that are either 0 or 1 as DISCRETE_BINARY. Examples may also recognize values which appear to have common statistical distributions such as a normal or exponential distributions and tag them accordingly. Similarly, if most of the values of a column are 0, but the remainder of the values have a recognizable distribution, examples can characterize/tag the column as a mixed discrete continuous distribution. Within a particular domain, examples may recognize specialized distributions based on column naming conventions combined with values. Accordingly, examples may characterize/tag values such as a temperature, overdraft fees, or other kinds of special purpose values.

Value Indicator Propagator 220: Value indicator propagator 220 may be a software or hardware program that propagates value and metadata indicators through data lineage representations (or in some cases metadata lineage representations) for data processing pipelines using various propagation algorithms. As described above, by performing such value indicator propagation, examples may discover (upstream) date-related products, processing steps, and/or metadata characteristics for (upstream) data-related products and processing steps—likely to produce new and useful/valuable (downstream) data-related products. While already discussed in conjunction with FIG. 1, additional examples of value indicator propagation will be discussed in subsequent figures.

Data Pipeline Catalog and Recommender 230: Data pipeline catalog and recommender 230 may be a software or hardware program that catalogs extracted metadata associated with data processing pipelines (including the data-related products and processing steps which comprise them) and recommends (upstream) data-related products and processing steps for producing new (downstream) data-related products based in part on value indicator propagation.

Data steps are often executed in a data scientist's or data user's favorite environment (which could include their personal laptop, an external system or even a remote edge). To allow such decentralized, platform agnostic operation, data pipeline catalog and recommender 230 may maintain exportable data-related packages (e.g., exportable dataset packages for individual datasets, exportable processing step packages for individual processing steps, exportable data processing pipeline packages for individual data processing pipelines, exportable data lineage representation packages, exportable metadata representation packages, etc.) which encapsulate various forms of data and metadata including data references, information for recreating the exportable data-related package, information for extracting/generating data lineage representations, information for generating metadata lineage representations, etc. Any user operating within a data processing pipeline (data gatherers, data scientists, domain experts, etc.) can inject explicit metadata into an exportable data-related package or even create a new exportable data-related package using tools that operate on exportable data-related packages. Such tools may allow a user to create lineage references for an exportable data-related package (which can be used by data analytics system 200 to extract/generate data lineage representations for data processing pipelines). Users may also utilize these tools to attribute transitive value credit to data-related products and processing steps associated with an exportable data-related package, or even to inject implicit recommendation indicators into the exportable data-related package. Data pipeline catalog and recommender 230 may index exportable data-related packages in a catalog which may include a search engine (e.g., Elastic Search) in order to serve recommendations.

As described above, examples may extract/generate data lineage representations for data processing pipelines which make lineal associations between and among upstream and downstream data-related products and the processing steps which transform them. Examples may also extract, characterize, and catalog metadata for the data-related products and the processing steps of a data processing pipeline. As will be described in conjunction with FIG. 3, examples may combine data lineage representations and extracted metadata for data processing pipelines to construct metadata lineage representations for data processing pipelines. In turn, examples may utilize these metadata lineage representations to derive metadata indicators that represent statistically interesting/significant correspondences perceived across the metadata lineages of "highly valued" data-related products. Examples may utilize derived metadata indicators to identify "high value influencing metadata characteristics" (i.e., metadata characteristics for (1) (upstream) data-related products and processing steps likely to increase/influence the value of (downstream) data-related products produced from them, and/or (2) metadata characteristics for a data-related product likely to increase/influence value for the data-related product itself. As indicated by the metadata indicators, these "high value influencing metadata characteristics" may be the metadata characteristics that arise with unusual/statistically significant frequency across the metadata lineages of "highly valued" data-related products.

In various examples, data pipeline catalog and recommender 230 may index both data-related products and processing steps based on (a) metadata extracted, (b) value credits accumulated/propagated back through lineage representations and (c) recommendation indicators. The indexes could include e.g., a search engine, a similarity index for data distributions, and a graph database.

While the recommendation may, in some examples, be based on recommendation indicators or co-occurrences of certain metadata across datasets, in some other examples, the recommendation may be based on other forms of analysis, including deep learning methods. For example, the extracted metadata and value indicators/credits may be input into a deep learning model, such as a deep learning recommendation model (DLRM) or Wide & Deep. In such examples, recommendations may be generated based on additional factors that are not captured in the indicators and co-occurrences.

Figure 3:
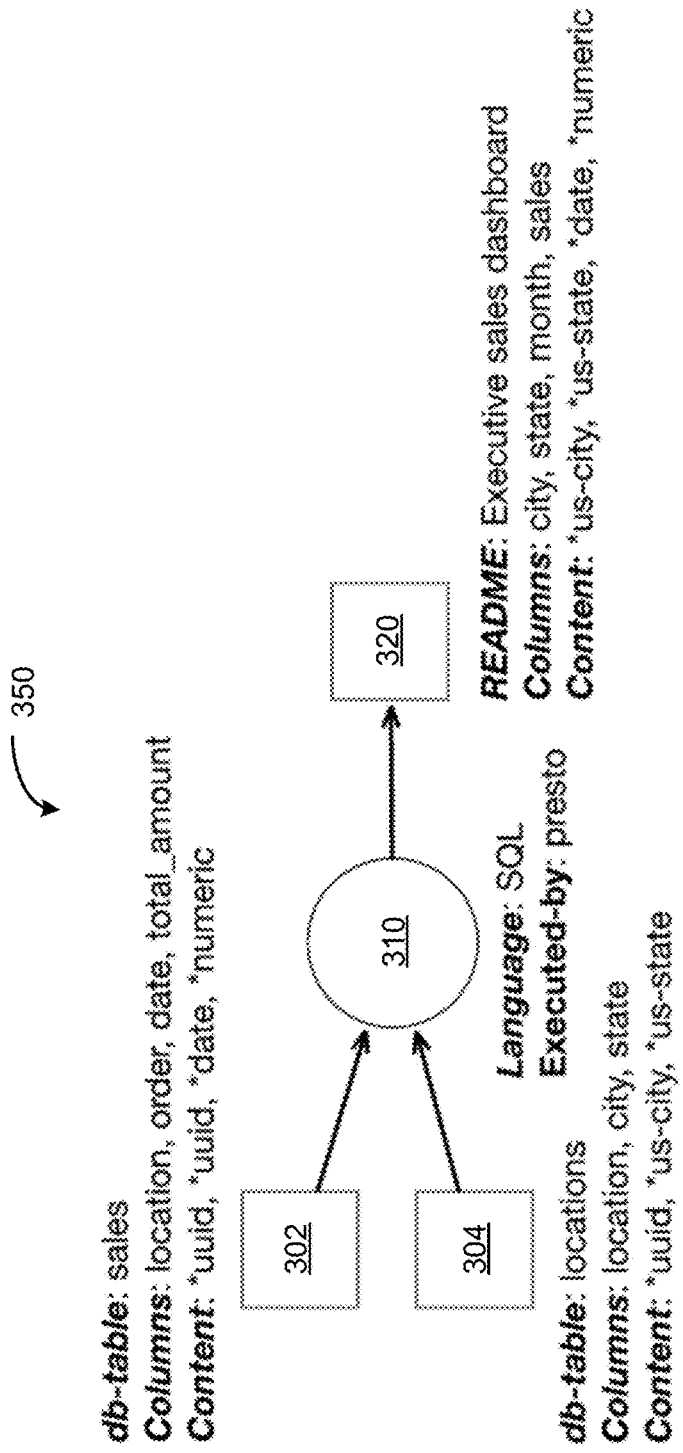
FIG. 3 depicts an example metadata lineage representation, in accordance with various examples of the presently disclosed technology.

FIG. 3 depicts an example metadata lineage representation 350 for a data processing pipeline 300, in accordance with various examples of the presently disclosed technology. Metadata lineage representation 350 includes lineal associations between upstream data-related products 302 and 304, processing step 310, and downstream data-related product 320.

In the simplified example of FIG. 3, upstream data-related product 302 may be a dataset containing data related to sales transactions, and upstream data-related product 304 may be a dataset containing locations. While not depicted, upstream data-related products 302 and 304 may be outputs of other processing steps of data processing pipeline 300. Upstream data-related products 302 and 304 may also be outputs from processing steps of other data processing pipelines.

Processing step 310 may be a join-type processing step which receives upstream data-related products 302 and 304 as inputs, and joins/transforms them into downstream data-related product 320, which may be an executive sales dashboard.

As depicted, examples of the presently disclosed technology (e.g., data analytics system 200) may have extracted metadata describing upstream data-related products 302, 304, and downstream data-related product 320. For example, the extracted metadata for upstream data-related product 302 may include a table name ("sales"), column names ("location," "order," "date," and "total_amount," etc.) and content tags ("*uuid," "*uuid," "*date," "*numeric," etc.). The extracted metadata for upstream data-related product 304 and downstream data-related product 320 may include similar descriptions.

Examples of the presently disclosed technology may have extracted metadata describing processing step 310 as well. In particular, the extracted metadata for processing step 310 includes a program language description ("SQL") and a description of the query engine/algorithm used for processing ("presto").

As depicted, metadata lineage representation 350 contains lineal associations for the above described metadata extracted from data processing pipeline 300. In other words, examples may associate the metadata extracted from processing step 310 with its output(s) (i.e., downstream data-related product 320). Likewise, examples can associate the metadata extracted from upstream data-related products 302 and 304 to (a) the processing step (i.e., processing step 310) which transforms them, and (b) the downstream data-related product they are transformed into (i.e., downstream data-related product 320). Accordingly, extracted metadata for upstream data-related products 302 and 304 may be referred to as "input metadata" for processing step 310 or output downstream data-related product 320. Similarly, the extracted metadata for processing step 310 may be referred to as "producer metadata" for downstream data-related product 320. Further, assuming data flow is acyclic, the transitive union of metadata for upstream data-related products 302-304 and processing step 310 may be referred to as "ancestor metadata" for downstream data-related product 320. Similarly, the transitive union of metadata for processing step 310 and downstream data-related product 320 may be referred to as "descendant metadata" for upstream data-related products 302-304. As will be described in greater detail below, examples may utilize metadata lineage representations such as metadata lineage representation 350 to discover/identify unusually common metadata characteristics shared among (a) highly valued data-related products (again, examples may attribute/quantify value for the data-related products using derived value indicators); and (b) (upstream) data-related products and processing steps used to produce highly valued data-related products. Accordingly, examples may provide data analytics systems that recommend these metadata characteristics for (a) data-related products likely to be valued by a data community; or (b) (upstream) data-related products and processing steps for producing (downstream) data-related products likely to be valued by a data community.

Figure 4:
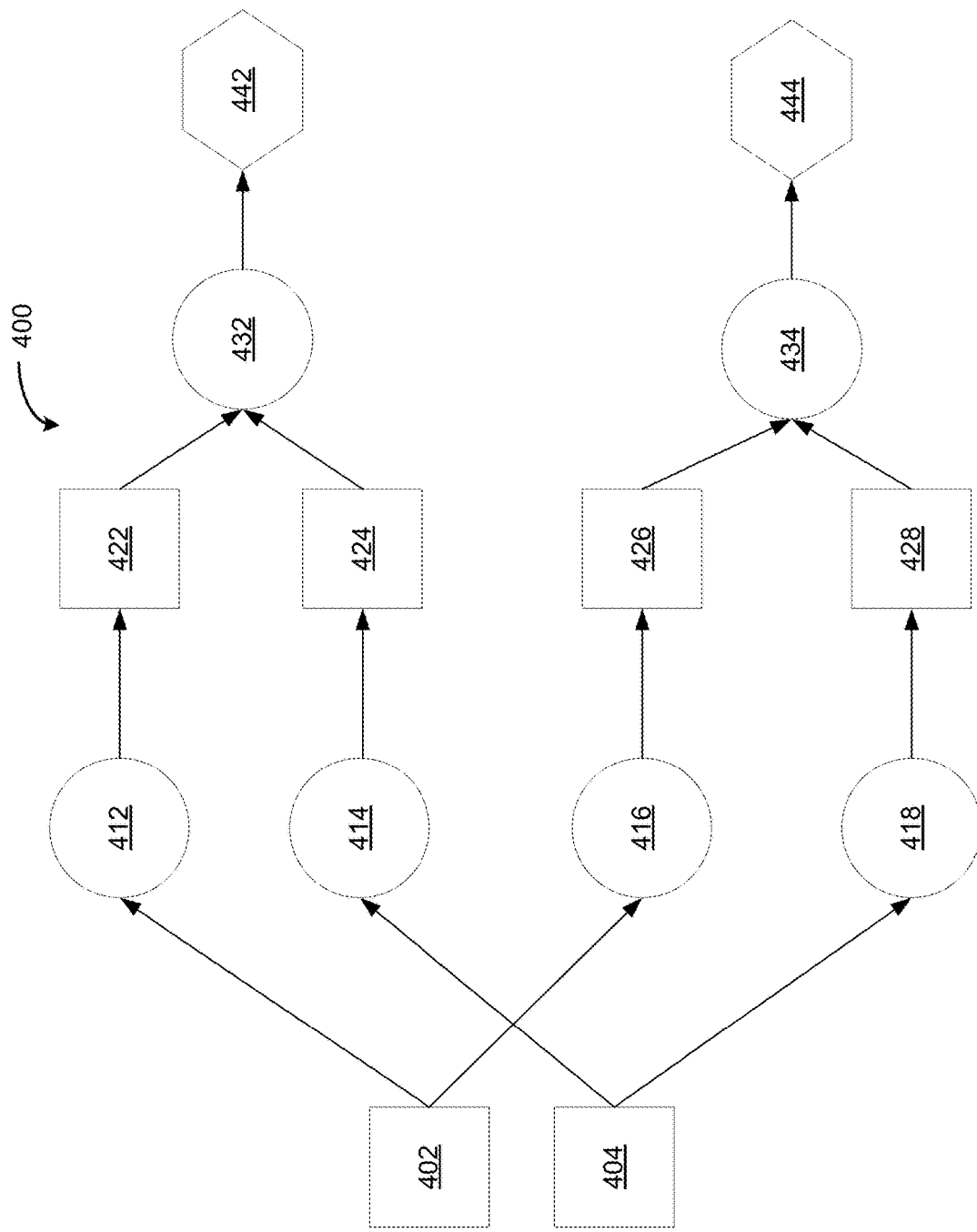
FIG. 4 depicts an example data lineage representation, in accordance with various examples of the presently disclosed technology.

FIG. 4 depicts an example data lineage representation 400, in accordance with various examples of the presently disclosed technology. Here, FIG. 4 may illustrate an example use-case describing how examples of the presently disclosed technology can recommend (1) (upstream) datasets and processing steps for producing new and useful/valuable data-related products, (2) metadata characteristics such (upstream) datasets and processing steps; and/or (3) metadata characteristics for new/prospective data-related products likely to be useful/valuable for a data consumer's target data analysis project.

In the example of FIG. 4, a data consumer may want to create an analytical model for vector-borne disease surveillance and prevention in the United States (i.e., the data consumer's target data analysis project). As will be described below, examples of the presently disclosed technology (e.g., data analytics system 200) may assist the user by recommending (1) (upstream) datasets and processing steps for producing the prospective analytical model, (2) metadata characteristics for such (upstream) datasets and processing steps; and/or (3) metadata characteristics for the prospective analytical model likely to improve the value of the prospective analytical model.

To start, examples of the presently disclosed technology may utilize value indicators to identify "valued" data-related products utilized in data analysis projects similar to the user's target data analysis project (i.e., vector borne disease surveillance and prevention). Accordingly, examples may identify data-related products 442 and 444, which may be analytical models used for disease prevention in countries outside the United States. Value indicators associated with data-related products 442 and 444 may quantify a level of value for data-related products 442 and 444 based on various human behavioral actions such as (1) how long they have been deployed in production; (2) how many users/data consumers have deployed them into production; (3) quality/accuracy scores attributed to them, etc. As described above, examples may utilize value indicators to compare/rank similar data-related products according to perceived value. Accordingly, examples may have selected data-related products 442 and 444 because they have the highest perceived value (as quantified by their associated value indicators) among the disease prevention and surveillance models identified. In some instances, examples may also select data-related products 442 and 444 because they have a desired metadata characteristic (e.g., weekly granularity).

As described above, examples may construct a data lineage representation (i.e., data lineage representation 400) for data-related products 442 and 444 which contains lineal associations between data-related products 442 and 444 and their ancestors processing steps (i.e., processing steps 412-418 and 432-434) and ancestor datasets (i.e., datasets 402-404 and 422-428). In some instances, data lineage representation 400 may be a metadata lineage representation that contains lineal associations between metadata characteristics extracted from data-related products 442 and 444 and their ancestors.

Utilizing data lineage analysis, examples may perceive/discover that data-related products 442 and 444 have been derived from two common ancestor datasets (i.e., datasets 402 and 404). Dataset 402 may be a dataset containing quarterly disease prevalence by city data. Extracted metadata for dataset 402 may include tags representing word distributions reflecting medical terms as well as names and distributions of columns for date ranges, geographical regions and cases by category/status, etc. Dataset 404 may be a dataset containing daily weather data. Extracted metadata for dataset 404 may include tags representing word distributions reflecting weather terms as well as names and distributions of columns for date ranges, geographical regions, temperature, humidity, precipitation, etc. Such extracted metadata may be referred to as implicit metadata to the extent it was not deliberately tagged/created by a data producer/consumer.

Again utilizing data lineage analysis, examples may perceive/discover that processing steps 412 and 414 have been used to transform datasets 402 and 404 into datasets 422 and 424 respectively. In particular, processing steps 412 and 414 may have been used to interpolate datasets 402 and 404 to a grid by day. Accordingly, datasets 422 and 424 may have a metadata characteristic of daily granularity.

Similarly, examples may perceive/discover that processing steps 416 and 418 have been used to transform datasets 402 and 404 into datasets 426 and 428 respectively. In particular, processing steps 416 and 418 may have been used to interpolate datasets 402 and 404 to a grid by week. Accordingly, datasets 426 and 428 may have a metadata characteristic of weekly granularity.

Examples may also perceive/discover that (1) processing step 432 has been used to transform datasets 422 and 424 into data-related product 442; and (2) processing step 434 has been used to transform datasets 426 and 428 into data-related product 444. Accordingly, data-related products 442 and 444 may be analytical models which utilize daily/weekly disease prevalence and weather data to make predictions related to disease surveillance and prevention.

As will be described in greater detail below, examples may utilize metadata lineage analysis to perceive/identify statistically interesting/significant correspondences across the metadata lineages of data-related products 442 and 444 (i.e., metadata indicators). Examples may utilize the metadata indicators to identify "high value influencing metadata characteristics." As described above, a "high value influencing metadata characteristic" may refer to (a) a metadata characteristic for an (upstream) data-related product/dataset or processing step likely to increase/influence the value of (downstream) data-related products produced from the (upstream) data-related product/dataset or processing step; and/or (b) a metadata characteristic for a data-related product likely to increase/influence the value of the data-related product likely itself. As indicated by the metadata indicators, these "high value influencing metadata characteristics" may be the metadata characteristics that arise with unusual/statistically significant frequency across the metadata lineages of data-related products 442 and 444. Examples may recommend novel combinations of (upstream) datasets and processing steps—having these "high value influencing metadata characteristics"—for producing new and useful/ valuable (downstream) data-related products. Accordingly, examples may recommend datasets and processing steps having those high-value influencing metadata characteristics for producing a valuable analytical model for disease prevention and surveillance in the United States. Relatedly, examples may recommend certain of these high-value influencing metadata characteristics for an improved analytical model used for disease prevention and surveillance in the United States.

In various instances, examples may train a machine learning model that learns to discover metadata indicators signifying a cross-occurrence/relation between the metadata characteristics of data lineage 400. In other words, the machine learning model may learn to discover metadata indicators signifying a cross-occurrence/relation between the metadata characteristics of the (upstream) datasets and processing steps and their corresponding descendants, including the metadata characterizing interpolation steps and the resulting high transitive value intermediate artifacts of suitable granularity for each task, from these lineages.

Figure 5:
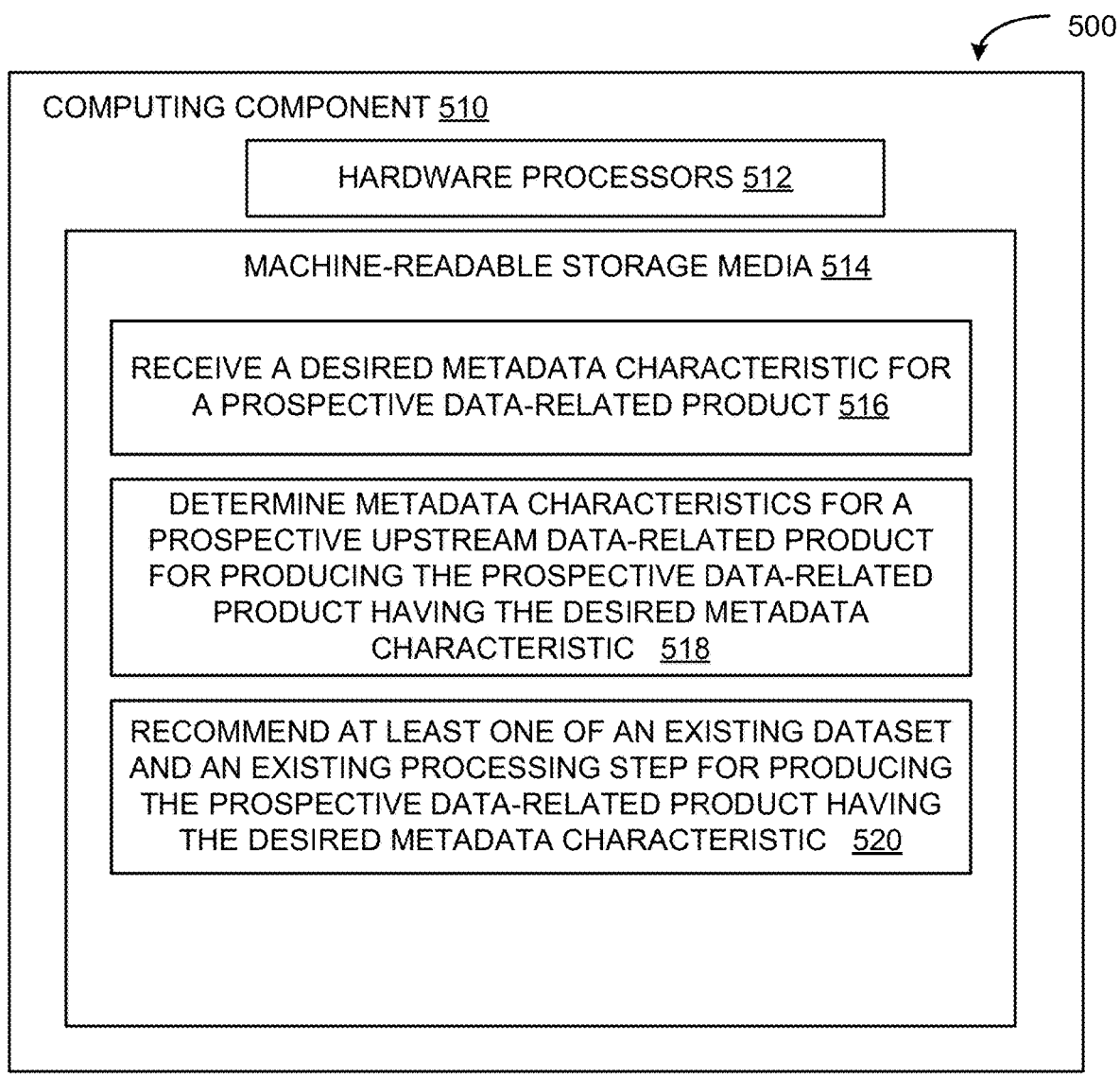
FIG. 5 depicts an example computing system that may be used to recommend at least one of an existing dataset and an existing processing step for producing a new/prospective data-related product having a desired metadata characteristic, in accordance with various examples of the presently disclosed technology.

FIG. 5 depicts an example computing system that may be used to recommend at least one of an existing dataset and an existing processing step for producing a new/prospective data-related product having a desired metadata characteristic, in accordance with various examples of the presently disclosed technology.

Referring now to FIG. 5, computing component 510 may be, for example, a server computer, a controller, or any other similar computing component capable of processing data. In the example implementation of FIG. 5, the computing component 510 includes a hardware processor 512, and machine-readable storage medium for 514.

Hardware processor 512 may be one or more central processing units (CPUs), semiconductor-based microprocessors, and/or other hardware devices suitable for retrieval and execution of instructions stored in machine-readable storage medium 514. Hardware processor 512 may fetch, decode, and execute instructions, such as instructions 516-520, to control processes or operations for burst preloading for available bandwidth estimation. As an alternative or in addition to retrieving and executing instructions, hardware processor 512 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 514, may be any electronic, magnetic, optical, or other physical storage device that contains or stores executable instructions. Thus, machine-readable storage medium 514 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 514 may be a non-transitory storage medium, where the term "non-transitory" does not encompass transitory propagating indicators. As described in detail below, machine-readable storage medium 514 may be encoded with executable instructions, for example, instructions 516-520.

As described above, computing system 500 may be used to recommend at least one of an existing dataset and an existing processing step for producing a new/prospective data-related product having a desired metadata characteristic. The new/prospective data-related product having the desired metadata characteristic may be for performing a data consumer's target data analysis project.

Accordingly, hardware processor 512 may execute instruction 516 to receive the desired metadata characteristic for the prospective data-related product. In various examples, hardware processor 512 may receive the desired metadata characteristic from the data consumer (e.g., a business user, a data scientist, a data engineer, a data gatherer, a data provider, etc.) seeking to deploy the prospective data-related product in a target data analysis project. In other examples, hardware processor 512 may automatically identify the desired metadata characteristic in response to receiving other parameters related to the data consumer's target data analysis project (e.g., type of project, geographic parameters for the project, type of data-related product sought, etc.). In these examples hardware processor 512 may receive the desired metadata characteristic from computing system 500.

The prospective data-related product may comprise various types of dataset-related products such as a dataset, an analytical model, a dashboard for displaying one or more of the foregoing data-related products, etc. The target data analysis project may be various types of data analysis projects such as a predictive project (e.g., predicting weather patterns), a modeling project (e.g., modeling the spread of vector borne disease in a country), etc.

The desired metadata characteristic may be various types of metadata characteristics for a data-related product. For example, the desired metadata characteristic may be a metadata characteristic for a dataset (e.g., textual documentation for the dataset, names of tables/columns/features of the dataset, descriptions of content within the dataset, data sizes within the dataset, data distributions within the dataset, etc.), a metadata characteristic for an analytical model (e.g., a programming language, particular input fields, a class of algorithm, etc.), a metadata characteristic for a dashboard (e.g., textual documentation for the dashboard, display names, types of displays, etc.), etc. In some examples, the desired metadata characteristic may be a metadata characteristic known by the data consumer to correlate with high performance in performing data analysis projects similar to the target data analysis project.

As described above, in some cases hardware processor 512 may generate/identify the desired metadata characteristic in response to receiving parameters related to the target data analysis project from the data consumer. In these examples, hardware processor 512 may predict that the desired metadata characteristic will correlate with high performance in performing the target data analysis project. In certain examples, hardware processor 512 may make this prediction using value indicators.

As described above, hardware processor 512 may derive value indicators using valuation algorithms that quantify a level of value for a given data-related product based on perceived human behavior relating to usage of the given data-related product (as used herein, a value indicator may refer to a quantifiable measurement of value for a given data-related product or processing step based on perceived human behavior relating to usage of the given data-related product/processing step). For instance, hardware processor 512 may utilize a simple valuation algorithm that quantifies a level of value for analytical models (i.e., examples of data-related products) based on how long humans have deployed them in production environments. Using this simple valuation algorithm, hardware processor 512 may attribute a value of, e.g., v=3, to an analytical model that has been deployed in production for three years, and a value of, e.g., v=2, to an analytical model that has been deployed in production for two years. In various instances, hardware processor 512 may utilize more complex valuation algorithms which quantify, to a common numerical scale, two or more categories of human behavioral actions relating to the usage of data-related products or processing steps. For instance, hardware processor 512 may utilize a more complex valuation algorithm to quantify, according to a common numerical scale, a level of value for analytical models based on any one or combination of the following factors: (a) a duration of time that humans/users have deployed the analytical models in production; (b) a number of independent users who have deployed the analytical models into production; and (c) quality/accuracy scores attributed to the analytical models (these quality/accuracy scores may be attributed to the given analytical model by humans, artificial intelligence, etc.). As described above, hardware processor 512 may utilize valuation algorithms to quantify a level of value for two or more analytical models using a common numerical scale. Accordingly, hardware processor 512 may utilize these valuation algorithms to compare/rank relative values for multiple analytical models based on multiple categories of human behavioral actions. Such a valuation algorithm may provide an enhanced approximation of actual human value judgements.

As stated above, hardware processor 512 may utilize value indicators to predict that the desired metadata characteristic will correlate with high performance in executing the target data analysis project. For example, hardware processor 512 may discover that 10,000 data-related products have been deployed in production environments by business users in similar data analysis projects similar to the data consumer's target data analysis project. Here, hardware processor 512 may utilize derived value indicators for the 10,000 data-related products to rank the 10,000 data-related products according to perceived value. As described above (and as will be described in greater detail below), hardware processor 512 may discover that the desired metadata characteristic is unusually common among e.g., the 1,000 data-related products having the highest perceived value (as quantified by their associated value indicators). Accordingly, hardware processor 512 may predict that the desired metadata characteristic will correlate with high performance for the data consumer's target data analysis project.

In response to receiving the desired metadata characteristic for the prospective data-related product, hardware processor 512 may execute instruction 518 to determine metadata characteristics for a prospective upstream data-related product for producing the prospective dataset-related output having the desired metadata characteristic.

The prospective upstream data-related product may be various types of dataset-related products that can be used to produce the prospective data-related product having the desired metadata characteristic (e.g., a dataset, an analytical model, a dashboard for displaying one or more of the foregoing data-related products, a combination of the foregoing dataset-related products, etc.).

Here, it should be understood that the prospective upstream data-related product need not be an existing data-related product. As will be described below, in various examples hardware processor 512 may recommend e.g., an existing dataset and a processing step for transforming the existing dataset into the prospective upstream data-related product (or at least a data-related product approximating the prospective upstream data-related product).

In various examples, hardware processor 512 may determine the metadata characteristics for the prospective upstream data-related product by: (1) identifying one or more existing data-related products having the desired metadata characteristic; (2) generating an augmented metadata lineage representation for the one or more existing data-related products having the desired metadata characteristic, the augmented metadata lineage representation comprising the following sub-representations: (a) a direct metadata sub-representation; (b) an ancestor metadata sub-representation; and (c) a descendant metadata sub-representation; (3) computing correspondences within the augmented metadata lineage representation; and (4) determining the metadata characteristics for the prospective upstream data-related product based on the computed correspondences. Each of these four steps will be described in greater detail below.

Identifying one or more existing data-related products having the desired metadata characteristic: Hardware processor 512 may identify one or more existing data-related products having the desired metadata characteristic using various techniques. In certain examples, hardware processor 512 may leverage the data pipeline catalog 230 described in conjunction with FIG. 2 to search for and identify the one or more existing data-related products having the desired metadata characteristic.

The identified existing data-related products may comprise various existing data-related products such as existing datasets, existing analytical models, existing dashboards for displaying one or more of the foregoing existing data-related products, etc.

Generating an augmented metadata lineage representation for the one or more identified existing data-related products having the desired metadata characteristic: After identifying the one or more existing data-related products having the desired metadata characteristic, hardware processor 512 may generate an augmented metadata representation for them. The augmented metadata representation may comprise the following sub-representations: (a) a direct metadata sub-representation; (b) an ancestor metadata sub-representation; and (c) a descendant metadata sub-representation The direct metadata sub-representation may comprise a representation of metadata characteristics extracted from the identified existing data-related products having the desired metadata characteristic. The extracted metadata characteristics may include the desired metadata characteristic, as well as other metadata characteristics extracted from the identified existing data-related products having the desired metadata characteristic. In various examples, hardware processor 512 may extract these metadata characteristics using the techniques described in conjunction with FIG. 2.

The ancestor metadata sub-representation may comprise a representation of metadata characteristics extracted from one or more ancestor datasets and one or more ancestor processing steps for the identified existing data-related products having the desired metadata characteristic. Here, a given ancestor dataset may be an existing dataset from which at least one of the identified existing data-related products having the desired metadata characteristic is derived using one or more of the ancestor processing steps.

The descendant metadata sub-representation may comprise metadata characteristics extracted from one or more descendant data-related products and one or more descendent processing steps for the identified existing data-related products having the desired metadata characteristic. Here, a given descendant data-related product may be an existing data-related product derived from at least one of the identified existing data-related products having the desired metadata characteristic using one or more of the descendant processing steps.

As described above, the augmented metadata lineage representation may represent a "metadata lineage" for each of the identified existing data-related products having the desired metadata characteristic. By generating such an augmented metadata lineage representation, hardware processor 512 may perceive/identify statistically interesting/significant correspondences across metadata lineages for the identified existing data-related products having the desired metadata characteristics (i.e., metadata indicators). These metadata indicators may then inform hardware processor 512's recommendation of existing datasets and/or processing steps for producing the prospective data-related product having the desired metadata characteristic.

In various examples, hardware processor 512 may generate the augmented metadata representation using (1) a lineage representation (e.g., a lineage table); and (2) a metadata representation (e.g., a metadata table). The lineage representation may represent, for a given identified existing data-related product having the desired metadata characteristic, a lineal representation that associates the given identified existing data-related product to (a) its ancestor datasets and processing steps; and (b) its descendent data-related products and processing steps. The metadata representation may represent the metadata extracted from (a) the given identified existing data-related product having the desired metadata characteristic; (b) its ancestor datasets and processing steps; and (c) its descendent data-related products and processing steps.

As an example to illustrate the concept, a metadata representation/table may have one row for (a) every identified existing data-related product having the desired metadata characteristic; (b) every ancestor dataset and processing step; and (c) every descendent data-related product and processing step. The metadata representation/table may then have one column for each atomic element of metadata.

As described above, a lineage representation/table may associate each identified existing data-related product having the desired metadata characteristic with (a) its ancestor datasets and processing steps; and (b) its descendant data-related products and processing steps.

Using the lineage and metadata representations/tables, hardware processor 512 can compute the augmented metadata lineage representation which represents the "metadata lineage" for each of the identified existing data-related products having the desired metadata characteristic.

In various examples, hardware processor 512 may use the following algorithm/functions to compute ancestor metadata: (i.e., metadata for the ancestor datasets and processing steps):

```
function ancestor_metadata(d::Dataset)
    meta = [ ]
    f = has_output(d)
    for dx in inputs_of(f)
        meta = meta ∪ meta_data(dx) ∪ ancestor_metadata(dx)
    end
end
```

Similarly, hardware processor 512 may use the following algorithm/functions to compute descendant metadata:

```
function descendant_metadata(d::Dataset)
    meta = [ ]
    for fx in uses(d)
        dx = output_of(fx)
        meta = meta ∪ meta_data(dx) ∪ descendant_metadata(dx)
    end
    return meta
end
```

Computing correspondences within the augmented metadata representation: In response to generating the augmented metadata lineage representation for the one or more identified existing data-related products having the desired metadata characteristic, hardware processor 512 may compute correspondences within the augmented metadata lineage representation. In other words, hardware processor 512 may compute correspondences between and among the metadata lineages for each of the identified existing data-related products having the desired metadata characteristic. In this way, hardware processor 512 may perceive/identify statistically interesting/significant correspondences across the metadata lineages of the identified existing data-related products having the desired metadata characteristic. As described above, these statistically interesting/significant correspondences may be referred to as metadata indicators.

The computed correspondences described above may comprise various types of correspondences such as cross-occurrences within the augmented metadata representation, co-occurrences within the augmented metadata representation, etc. In certain examples, hardware processor 512 may compute co-occurrences among metadata characteristics for the identified existing data-related products having the desired metadata characteristic utilizing the direct metadata sub-representation. In some examples, hardware processor 512 may compute cross-occurrences across the metadata lineages of the identified existing data-related products having the desired metadata characteristic using the augmented metadata lineage representation. Such computation may include computing cross-occurrences between metadata characteristics of the identified existing data-related products having the desired metadata characteristic and their ancestors and/or descendants.

For example, hardware processor 512 can compute the cross-occurrence of metadata characteristics between the direct metadata sub-representation and the ancestor metadata sub-representation. Similarly, hardware processor 512 can compute the cross-occurrence of metadata characteristics between the direct metadata sub-representation and the descendent metadata sub-representation, etc. Hardware processor 512 may then identify cross-occurrences that are statistically interesting/significant according to a statistical score such as a G 2 test.

As described above, while the recommendations of the presently disclosed technology may, in some examples, be based on recommendation indicators or co-occurrences of certain metadata across datasets, in some other examples, the recommendation may be based on other forms of analysis, including deep learning methods. For example, the extracted metadata and value indicators/credits may be input into a deep learning model, such as the deep learning recommendation model (DLRM) or Wide & Deep. In such examples, recommendations may be generated based on additional factors that are not captured in the indicators and co-occurrences. For instance, in certain examples, recommendation models (such as hardware processor 512) can be trained to make the computations described above using techniques such as matrix factorization or deep learning.

In various examples, hardware processor 512 may generate a representation for the metadata indicators described above, which may be referred to as a metadata indicator representation. In various examples, hardware processor 512 may utilize this metadata indicator representation to recommend metadata characteristics for datasets and processing steps likely to produce valuable data-related products (similarly, hardware processor 512 may use a metadata indicator representation to recommend metadata characteristics for valuable data-related products). In certain examples, the metadata indicator representation may comprise a row for each direct metadata element and columns for each ancestor or descendant metadata element/value. An example metadata indicator representation/table is depicted below:

|  | *dashboard | not(*dashboard) |
|---|---|---|
| SQL* | $k_{SQL,dashboard}$ | $k_{SQL,\neg dashboard}$ |
| not(SQL*) | $k_{\neg SQL,dashboard}$ | $k_{\neg SQL,\neg dashboard}$ |

The example metadata indicator representation/table above has one row per atomic direct metadata value and one column per unique value of ancestor or descendent metadata. Metadata indicator representations/tables such as the example depicted above may typically be sparse (with no more than roughly a hundred non-zero values per row). In some instances, hardware processor 512 may reduce the computation that creates a metadata indicator representation/table by down sampling in the cross-occurrence computation to be linear in the total number of non-zero elements in the original augmented metadata representation.

Determining the metadata characteristics for the prospective upstream data-related product for producing the prospective data-related product having the desired metadata characteristic based on the computed correspondences: As described above, hardware processor 512 may derive metadata indicators (or in some examples, a metadata indicator representation) from the augmented metadata lineage representation that represent statistically interesting/significant correspondences perceived across the metadata lineages of the identified existing data-related products having the desired metadata characteristic. Examples may utilize these derived metadata indicators to identify metadata characteristics that arise with unusual/statistically significant frequency across the metadata lineages of the identified existing data-related products having the desired metadata characteristic. As examples of the presently disclosed technology appreciate, existing datasets and processing steps having these "key" metadata characteristics may have an improved likelihood of producing data-related products having the desired metadata characteristic. Accordingly, hardware processor 512 may determine one or more of these "key" metadata characteristics as suitable/key metadata characteristics for the prospective upstream data-related product for producing the prospective data-related product having the desired metadata characteristic In response to determining metadata characteristics for the prospective upstream data-related product for producing the prospective dataset-related output having the desired metadata characteristic, hardware processor 512 may execute instruction 520 to recommend at least one of an existing dataset and an existing processing step for producing the prospective data-related product having the desired metadata characteristic.

As described above, the recommended existing dataset(s) and/or processing step(s) may contain one or more of the determined metadata characteristics for the prospective upstream data-related product for producing the prospective data-related product having the desired metadata characteristic. In other words, individually, or when combined, the recommended existing dataset(s) and/or processing step(s) may approximate the prospective upstream data-related product for producing the prospective data-related product having the desired metadata characteristic.

As described above, prospective upstream data-related product for producing the prospective data-related product having the desired metadata characteristic may not be an existing data-related product. Accordingly, hardware processor 512 may recommend, e.g., an existing dataset and an existing processing step that have never been combined. However, hardware processor 512 may predict that the recommended existing processing step will transform the recommended existing dataset into a data-related product which approximates the prospective upstream data-related product for producing the prospective data-related product having the desired metadata characteristic. In this way, hardware processor 512 can recommend datasets and processing steps as they presently exist, but also as they plausibly could be.

Figure 6:
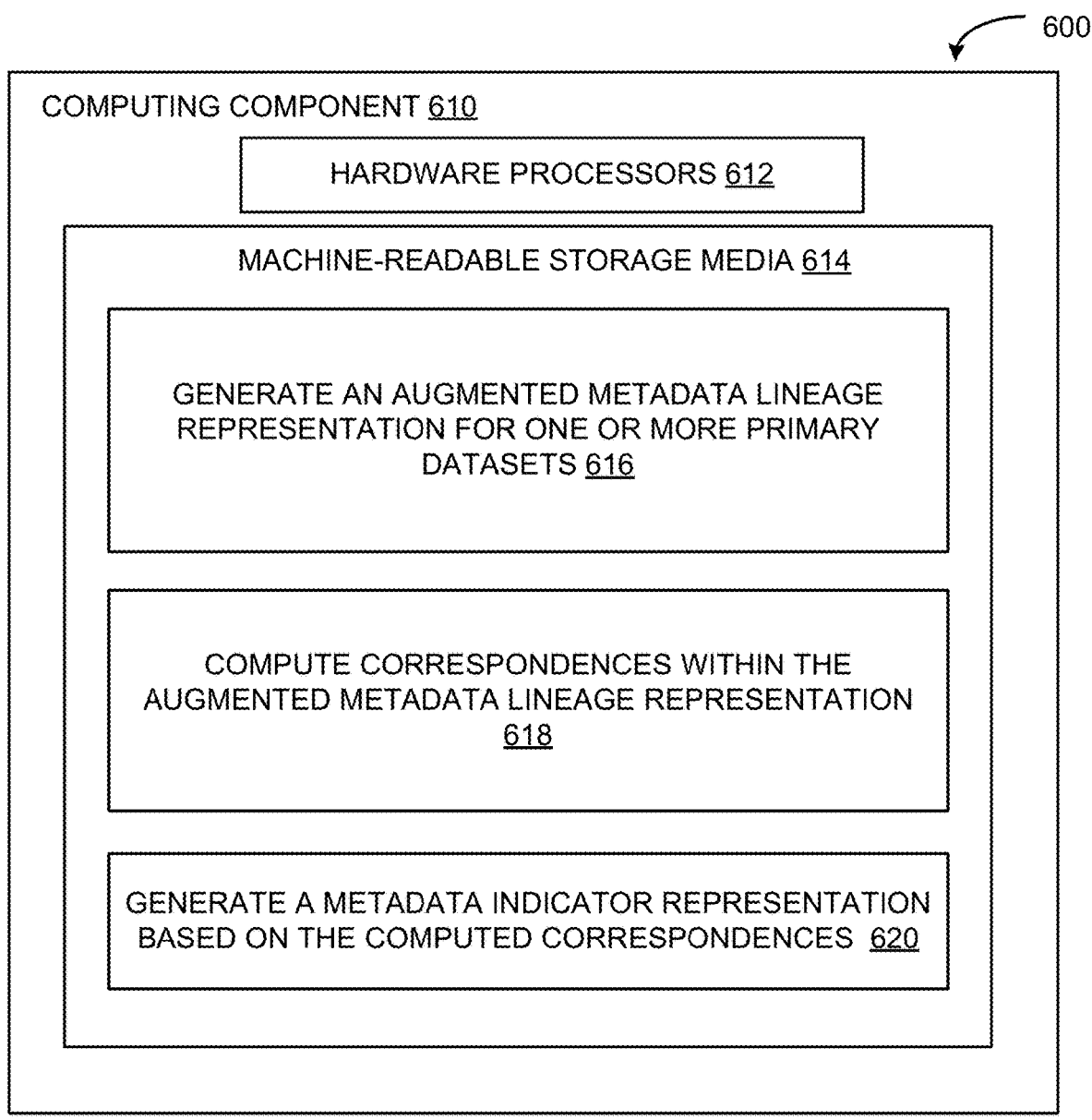
FIG. 6 depicts an example computing system that may be used to generate a metadata indicator representation, in accordance with various examples of the presently disclosed technology.

FIG. 6 depicts an example computing system 600 that may be used to generate a metadata indicator representation, in accordance with various examples of the presently disclosed technology. Referring now to FIG. 6, computing component 610 may be, for example, a server computer, a controller, or any other similar computing component capable of processing data. In the example implementation of FIG. 6, the computing component 610 includes a hardware processor 612, and machine-readable storage medium for 614.

Hardware processor 612 and machine-readable storage medium 614 may be the same/similar as hardware processor 512 and machine-readable storage medium 514 respectively. Accordingly, machine-readable storage medium 614 may be encoded with executable instructions, for example, instructions 616-620.

Hardware processor 612 may execute instruction 616 to generate an augmented metadata lineage representation for one or more primary datasets. In various examples, hardware processor 612 may have identified the one or more primary datasets as valuable datasets based on value indicators derived from human behavior (e.g., usage of the primary datasets in numerous data processing pipelines). In other examples, the one or more primary datasets may have a desired metadata characteristic that a data consumer would like to replicate in a new/prospective dataset.

As described in conjunction with FIG. 5, the augmented metadata lineage representation may comprise (a) a direct metadata sub-representation; (b) an ancestor metadata sub-representation; and (c) a descendant metadata sub-representation.

The direct metadata sub-representation may comprise a representation of metadata characteristics extracted from the primary datasets.

The ancestor metadata sub-representation may comprise a representation of metadata characteristics extracted from one or more ancestor datasets and one or more ancestor processing steps for the primary datasets. Here, a given ancestor dataset may be an existing dataset from which at least one primary dataset is derived using one or more of the ancestor processing steps.

The descendant metadata sub-representation may comprise metadata characteristics extracted from one or more descendant datasets and one or more descendent processing steps for the primary datasets. Here, a given descendant dataset may be an existing dataset derived from at least one of the primary datasets using one or more of the descendant processing steps.

As described above, the augmented metadata lineage representation may represent a "metadata lineage" for each of the primary datasets. By generating such an augmented metadata representation, hardware processor 612 may identify/perceive statistically interesting/significant correspondences across and among metadata lineages for the primary datasets (i.e., metadata indicators), which hardware processor 612 can use to generate a metadata indicator representation.

As described in conjunction with FIG. 5, hardware processor 612 may generate the augmented metadata lineage representation using (1) a lineage representation (e.g., a lineage table); and (2) a metadata representation (e.g., a metadata table). The lineage representation may represent, for a given primary dataset, a lineal representation that associates the given primary dataset to (a) its ancestor datasets and processing steps; and (b) its descendent datasets and processing steps. The metadata representation may represent, for a given primary dataset, the metadata extracted from (a) the given primary dataset; (b) its ancestor datasets and processing steps; and (c) its descendent datasets and processing steps.

As an example to illustrate the concept, the metadata representation (e.g., a metadata table) may have one row for every primary dataset, ancestor dataset and processing step, and descendent dataset and processing step—and one column for each atomic element of metadata.

As described above, the lineage representation may associate each primary dataset with (a) its ancestor datasets and processing steps; and (b) its descendent datasets and processing steps.

Using the lineage and metadata representations, hardware processor 612 can compute the augmented metadata lineage representation which represents the "metadata lineage" for each of the primary datasets.

In various examples, hardware processor 612 may use the following algorithm/functions to compute ancestor metadata for a given primary dataset (i.e., metadata for the ancestor datasets and processing steps that produce the given primary dataset):

```
function ancestor_metadata(d::Dataset)
    meta = [ ]
    f = has_output(d)
    for dx in inputs_of(f)
        meta = meta ∪ meta_data(dx) ∪ ancestor_metadata(dx)
    end
end
```

Similarly, hardware processor 612 may use the following algorithm/functions to compute descendant metadata for a given primary dataset:

```
function descendant_metadata(d::Dataset)
    meta = [ ]
    for fx in uses(d)
        dx = output_of(fx)
        meta = meta ∪ meta_data(dx) ∪ descendant_metadata(dx)
    end
    return meta
end
```

In response to generating the augmented metadata lineage representation (comprising the direct metadata sub-representation, the ancestor metadata sub-representation, and the descendant metadata sub-representation) hardware processor 612 may execute instruction 618 to compute correspondences between the direct metadata sub-representation and at least one of the ancestor metadata sub-representation and the descendant metadata sub-representation. In this way, hardware processor 612 may perceive/identify statistically interesting/significant correspondences across the metadata lineages of the primary datasets. As described above, these statistically interesting/significant correspondences may be referred to as metadata indicators.

The computed correspondences described above may comprise various types of correspondences such as cross-occurrences and co-occurrences.

For example, hardware processor 612 can compute the cross-occurrence of metadata characteristics between the direct metadata sub-representation and the ancestor metadata sub-representation. Hardware processor 612 may then identify cross-occurrences that are statistically interesting/significant (i.e., metadata indicators) as judged using a statistical score such as a $G^2$ test. As will be described below, hardware processor 612 may utilize these metadata indicators to generate a metadata indicator representation.

Accordingly, hardware processor 612 may execute instruction 620 to generate a metadata indicator representation that represents the statistically interesting/significant correspondences computed at instruction 618.

In various examples, the metadata indicator representation may be a table comprising a row for each direct metadata element and columns for each ancestor or descendant metadata element/value. An example metadata indicator representation/table is depicted below:

|  | *dashboard | not(*dashboard) |
|---|---|---|
| SQL* | $k_{SQL, dashboard}$ | $k_{SQL, \neg dashboard}$ |
| not(SQL*) | $k_{\neg SQL, dashboard}$ | $k_{\neg SQL, \neg dashboard}$ |

The example metadata indicator representation/table above has one row per atomic direct metadata value and one column per unique value of ancestor or descendent metadata. Metadata indicator representations such as the example depicted above may typically be sparse (with no more than roughly a hundred non-zero values per row). In some instances, hardware processor 612 may reduce the computation that generates the metadata indicator representation/table by down sampling in the cross-occurrence computation to be linear in the total number of non-zero elements in the original augmented metadata representation.

As described above, in various examples, hardware processor 612 may have identified the one or more primary datasets as high value datasets based on value indicators derived from human behavior (e.g., usage of the datasets in numerous data processing pipelines). Thus, the generated metadata indicator representation may represent statistically interesting/significant metadata correspondences within and among the metadata lineages of high value datasets. Accordingly, examples of the presently disclosed technology may leverage the metadata indicator representation to identify "high value influencing metadata characteristics." As described above, a "high value influencing metadata characteristic" may refer to (a) a metadata characteristic for an (upstream) data-related product or processing step likely to increase/influence the value of a (downstream) data-related product produced from the (upstream) data-related product or processing step; and/or (b) a metadata characteristic for a data-related product likely to increase/influence the value of the data-related product itself. As indicated by the metadata indicators, these "high value influencing metadata characteristics" may be the metadata characteristics that arise with unusual/statistically significant frequency across the metadata lineages of high value datasets. Accordingly, hardware processor 612 may identify and recommend novel combinations of existing datasets and processing steps—having these "high value influencing metadata characteristics"—for producing a new/prospective high value dataset.

Figure 7:
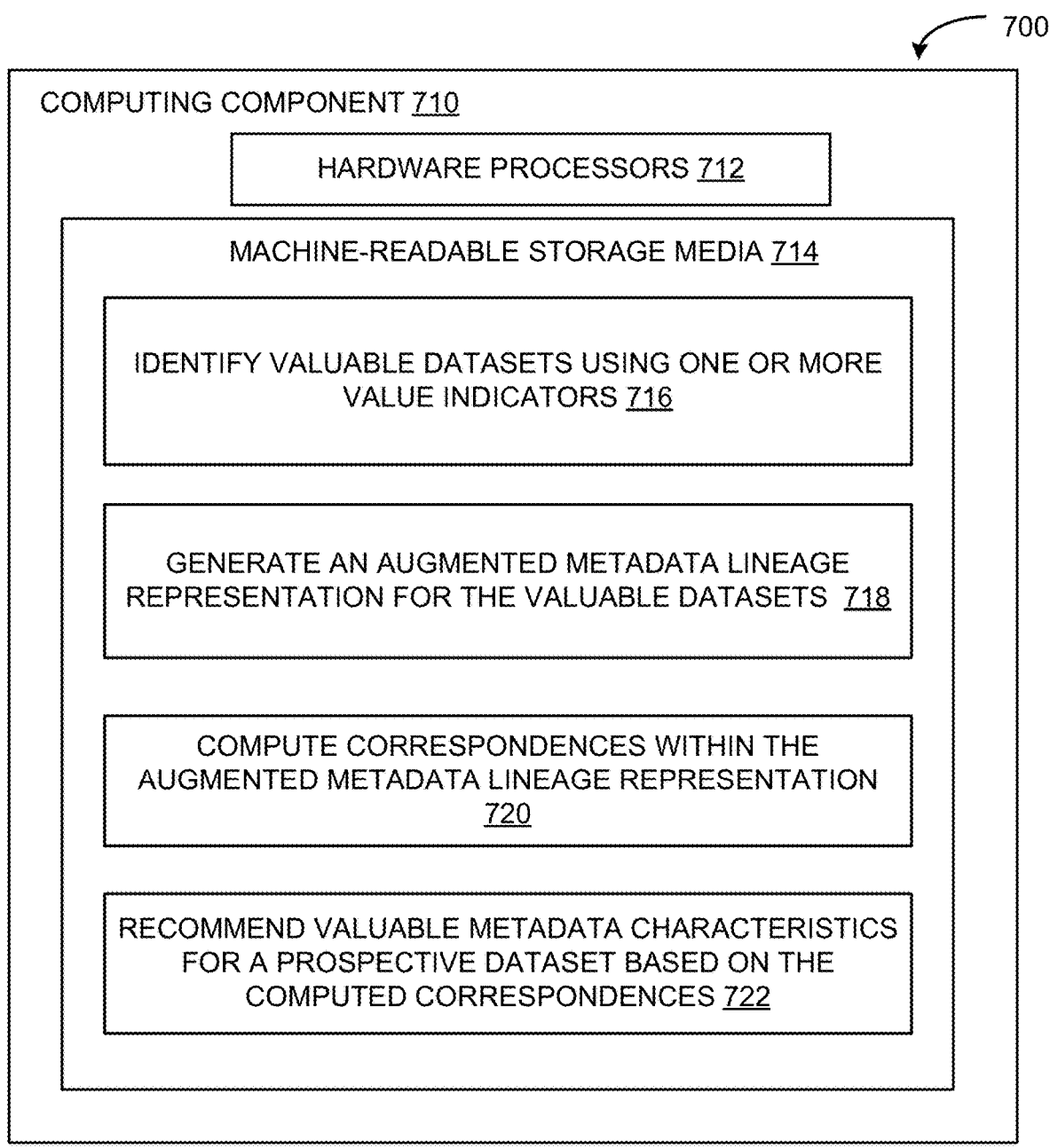
FIG. 7 depicts an example computing system that may be used to recommend valuable metadata characteristics for a new/prospective dataset, in accordance with various examples of the presently disclosed technology.

FIG. 7 depicts an example computing system 700 that may be used to recommend valuable metadata characteristics for a prospective dataset, in accordance with various examples of the presently disclosed technology. Referring now to FIG. 7, computing component 710 may be, for example, a server computer, a controller, or any other similar computing component capable of processing data. In the example implementation of FIG. 7, the computing component 710 includes a hardware processor 712, and machine-readable storage medium for 714.

Hardware processor 712 and machine-readable storage medium 714 may be the same/similar as hardware processor 512 and machine-readable storage medium 514 respectively. Accordingly, machine-readable storage medium 714 may be encoded with executable instructions, for example, instructions 716-722.

Hardware processor 712 may execute instruction 716 to identify one or more valuable datasets using one or more value indicators. Hardware processor 712 may derive value indicators using valuation algorithms that quantify a level of value for a given data-related product (e.g., a dataset) based on perceived human behavior relating to usage of the given data-related product (as used herein, a value indicator may refer to a quantifiable measurement of value for a data-related product or processing step based on perceived human behavior relating to usage of the given data-related product/processing step). Accordingly, hardware processor 712 may utilize these valuation algorithms to compare/rank relative values for multiple datasets based on multiple categories of human behavioral actions. Hardware processor 712 may then use this ranking to identify the one or more valuable datasets.

Hardware processor 712 may execute instruction 718 to generate an augmented metadata lineage representation for the identified valuable datasets. Hardware processor 712 may execute this instruction in the same/similar manner as described in conjunction with FIGS. 5-6.

Hardware processor 712 may execute instruction 720 to compute correspondences within the augmented metadata lineage representation. Hardware processor 712 may execute this instruction in the same/similar manner as described in conjunction with FIGS. 5-6.

Hardware processor 712 may execute instruction 722 to recommend valuable metadata characteristics for a prospective dataset based on the computed correspondences. As described in conjunction with FIGS. 5-6, hardware processor 712 may perceive/identify statistically interesting/significant correspondences within the metadata lineages of the identified valuable datasets. As described above, these statistically interesting/significant correspondences may be referred to as metadata indicators. Using these metadata indicators, hardware processor 712 can identify "high value influencing metadata characteristics." As described above, a "high value influencing metadata characteristic" may refer to (a) a metadata characteristic for an (upstream) data-related product or processing step likely to increase/influence the value of a (downstream) data-related product produced from the (upstream) data-related product or processing step; and/or (b) a metadata characteristic for a data-related product likely to increase/influence the value of the data-related product. As indicated by the metadata indicators, these "high value influencing metadata characteristics" may be the metadata characteristics that arise with unusual/statistically significant frequency across the metadata lineages of the identified valuable datasets. Accordingly, hardware processor 712 can recommend these metadata characteristics as valuable metadata characteristics for the prospective dataset. As examples of the presently disclosed technology appreciate, the prospective dataset having these high value influencing metadata characteristics may be more likely to be utilized/valued by data scientists and engineers who consume datasets. Accordingly, data producers may utilize computing system 700 to identify/create prospective datasets (having high value influencing metadata characteristics) that are likely to be valued by members of a data community.

Figure 8:
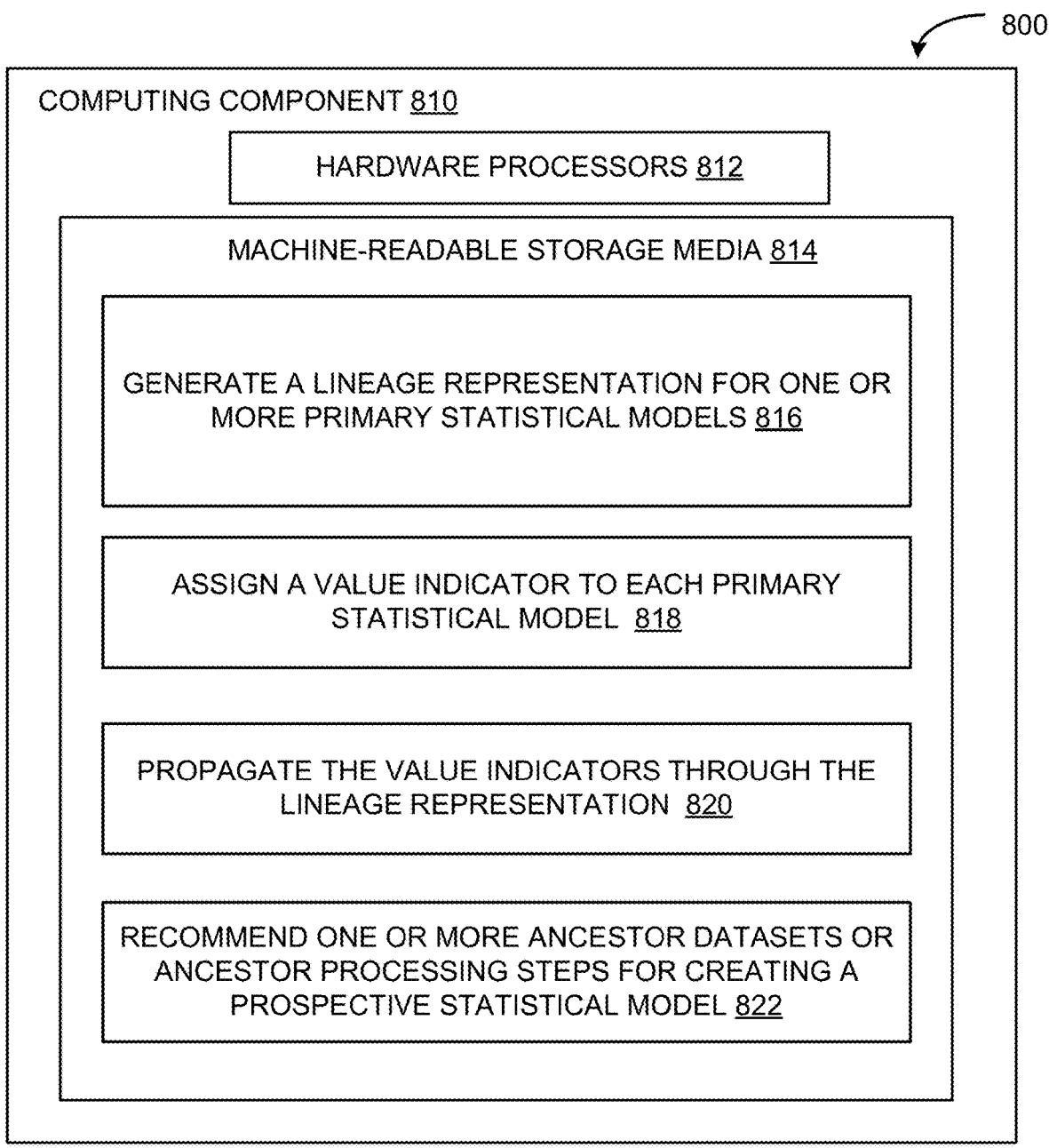
FIG. 8 depicts an example computing system that may be used to recommend one or more existing datasets and processing steps for creating a valuable analytical model based on propagating value indicators through a lineage representation for one or more existing analytical models, in accordance with various examples of the presently disclosed technology.
Figure 9:
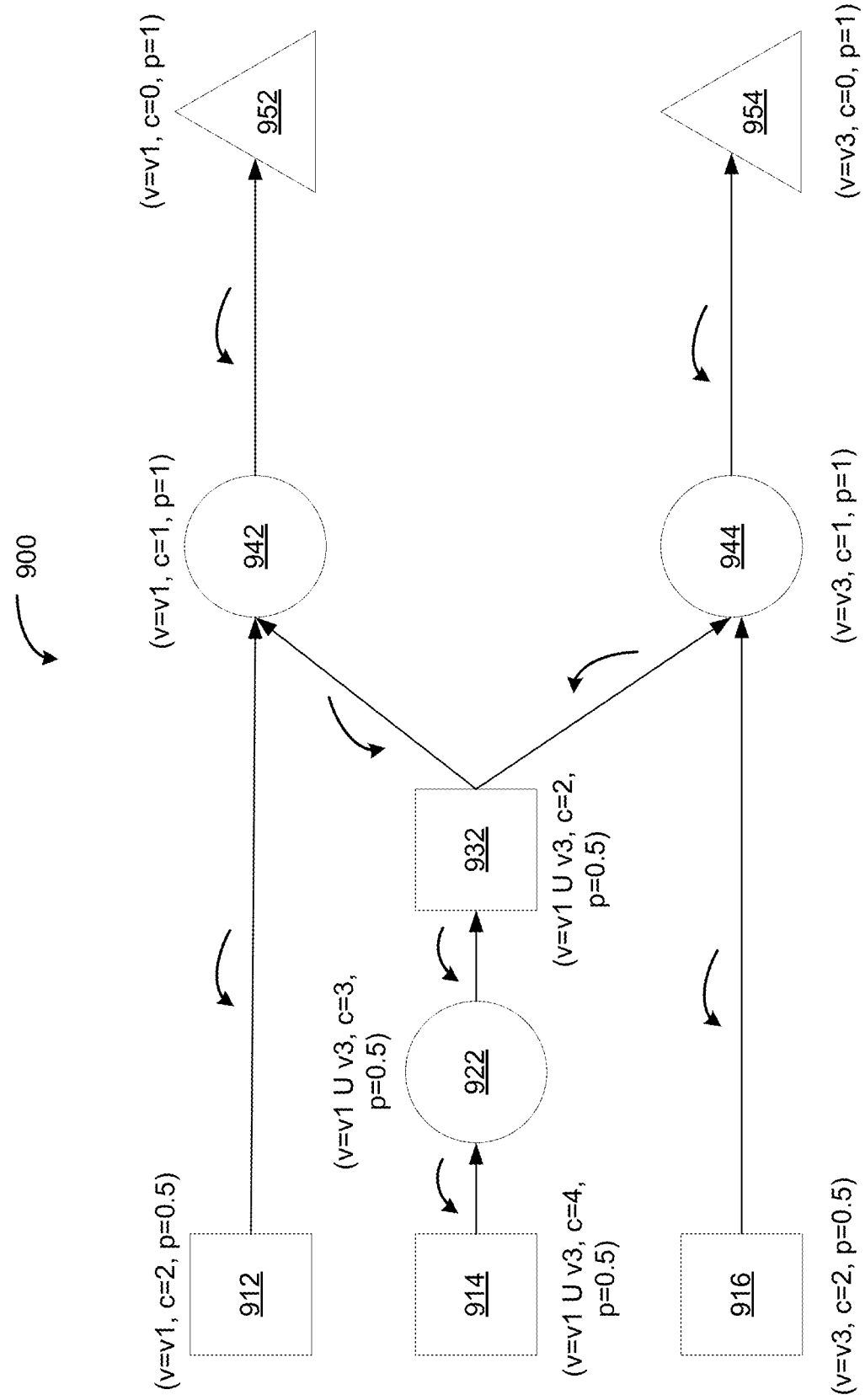
FIG. 9 depicts an example data lineage representation which can be used to illustrate examples of value indicator propagation, in accordance with various examples of the presently disclosed technology.

FIG. 8 depicts an example computing system 800 that may be used to recommend one or more existing datasets and processing steps for creating a valuable analytical model based on propagating value indicators through a lineage representation for one or more existing analytical models, in accordance with various examples of the presently disclosed technology. FIG. 9 depicts an example lineage representation 900 which can be used to illustrate examples of value indicator propagation described in conjunction with FIG. 8.

Referring now to FIG. 8, computing component 810 may be, for example, a server computer, a controller, or any other similar computing component capable of processing data. In the example implementation of FIG. 8, the computing component 810 includes a hardware processor 812, and machine-readable storage medium for 814.

Hardware processor 812 and machine-readable storage medium 814 may be the same/similar as hardware processor 512 and machine-readable storage medium 514 respectively. Accordingly, machine-readable storage medium 814 may be encoded with executable instructions, for example, instructions 816-822.

Hardware processor 812 may execute instruction 816 to generate a lineage representation for one or more primary analytical models. The one or more primary analytical models may be various types of existing analytical models. Some of the primary analytical models may be deployed in production environments, while others may not be deployed in production. In some examples, hardware processor 812 may retrieve/extract the information required to generate the lineage representation for the primary analytical models from a data pipeline catalog such as that described in conjunction with FIG. 2.

For a given primary analytical model, the lineage representation may comprise a lineal representation of one or more ancestor datasets and one or more ancestor processing steps used to derive the given primary analytical model. The ancestor datasets and ancestor processing may be existing datasets and processing steps cataloged in a data pipeline catalog such as that described in conjunction with FIG. 2.

Referring now to FIG. 9, lineage representation 900 depicts an example lineage representation that hardware processor 812 may generate.

In particular, lineage representation 900 comprises lineal representations for primary analytical models 952 and 954 and their respective ancestor processing steps and datasets.

Moving from downstream to upstream for primary analytical model 952, primary analytical model 952 has an ancestor processing step 942 that transforms ancestor datasets 912 and 932 into primary analytical model 952. Ancestor dataset 932 itself has an ancestor processing step 922 that transforms ancestor dataset 914 into ancestor dataset 932. Accordingly, primary analytical model 952 has two ancestor processing steps (i.e., ancestor processing step 922 and 942) and three ancestor datasets (i.e., ancestor datasets 912, 914, and 932).

Moving from downstream to upstream for primary analytical model 954, primary analytical model 954 has an ancestor processing step 944 that transforms ancestor datasets 916 and 932 into primary analytical model 954. As noted above, ancestor dataset 932 itself has an ancestor processing step 922 that transforms ancestor dataset 914 into ancestor dataset 932. Accordingly, primary analytical model 954 has two ancestor processing steps (i.e., ancestor processing step 922 and 944) and three ancestor datasets (i.e., ancestor datasets 914, 916, and 932).

Here, it should be noted that primary analytical models 952 and 954 share certain ancestor datasets and processing steps (i.e., ancestor datasets 914 and 932 and ancestor processing step 922). As will be described below, when hardware processor 812 propagates value measurements through lineage representation 900, these shared ancestor datasets and processing steps may aggregate (i.e., transitively accumulate) value measurements from both primary analytical models 952 and 954.

Referring again to FIG. 8, hardware processor 812 may execute instruction 818 to assign a value indicator to each of the one or more primary analytical models. As described above, a value indicator may refer to a quantifiable measurement of value for a given primary analytical model based on perceived human behavior relating to usage of the given primary analytical model.

Hardware processor 812 may the derive value indicators using valuation algorithms that quantify a level of value for each of the one or more primary analytical models. For instance, hardware processor 812 may utilize a simple valuation algorithm that quantifies a level of value for the primary analytical models based on how long humans have deployed them in production environments. Using this simple valuation algorithm, hardware processor 812 may assign a value of, e.g., v=v3, to a primary analytical model that has been deployed in production for three years, and a value of, e.g., v=v1, to a primary analytical model that has been deployed in production for one year. In various instances, hardware processor 812 may utilize more complex valuation algorithms which quantify, to a common numerical scale, two or more categories of human behavioral actions relating to the usage of the primary analytical models. For instance, hardware processor 812 may utilize a more complex valuation algorithm to quantify, according to a common numerical scale, a level of value for the primary analytical models based on any one or combination of the following factors: (a) a duration of time that humans/users have deployed the primary analytical models in production; (b) a number of independent users who have deployed the primary analytical models into production; and (c) quality/accuracy scores attributed to the primary analytical models (these quality/accuracy scores may be attributed to the primary analytical model by humans, artificial intelligence, etc.).

Referring now to FIG. 9, in various examples hardware processor 812 may assign value indicators to primary analytical models 952 and 954. In the specific example of FIG. 9, the assigned value indicators may quantify an amount of time (e.g., hours, days, weeks, etc.) that a given primary analytical model has been deployed in production. As depicted, hardware processor 812 has assigned primary analytical model 952 a value measurement of v=v1, and primary analytical model 954 a value measurement of v=v3. This may signify that primary analytical model 954 has been deployed in production three times longer than primary analytical model 952.

Referring again to FIG. 8, hardware processor 812 may execute instruction 820 to propagate the assigned value indicators for each primary analytical model through the lineage representation. In other words, hardware processor 812 can compute (i.e., back-propagate) the flow of value through the lineage representation in the reverse/upstream direction (as depicted by the arrows in FIG. 9) to identify ancestor datasets and processing steps that are most likely to produce valuable analytical models.

In various examples, hardware processor 812 may execute the value propagating by: (1) attributing, to each ancestor dataset and ancestor processing step of a given primary analytical model, the value indicator for the given primary analytical model; and (2) aggregating, for a given ancestor dataset or ancestor processing step, one or more of the value indicators attributed to the given ancestor dataset or ancestor processing step. In certain of these examples, hardware processor 812 may reduce an aggregated value indicator according to a cost to realize the aggregated value indicator for a given ancestor. Similarly, hardware processor 812 may reduce an aggregated value indicator for a given ancestor according to a level of remoteness between the given ancestor and its one or more associated primary analytical models. Here, the level of remoteness between the given ancestor and a given descendant may be measured by the number of ancestors between the given ancestor and the given descendant along the lineal representation for the given ancestor and given descendant (e.g., mother vs. grandmother vs. great grandmother, etc.).

Referring now again to FIG. 9, as depicted, hardware processor 812 can (back) propagate the value indicators assigned to primary analytical models 952 and 954 through lineage representation 900 to assign transitive value credit to their ancestors. As depicted, hardware processor 812 aggregates value indicators for common ancestors shared by primary analytical models 952 and 954. In particular, ancestor datasets 932 and 914 and ancestor processing step 922 all have the same aggregated value indicator: $v=v1 \cup v3$.

As depicted in the example of FIG. 9, hardware processor 812 may also reduce (i.e., discount) the aggregated value indicator for a given ancestor according to various factors. In these examples, hardware processor 812 may propagate the value indicators as a single dimension/parameter of a multi-dimensional vector that includes other dimensions/parameters for reducing attributed/aggregated value indicators.

For example, hardware processor 812 may propagate value indicators using vectors having the following dimensions defined below (and illustrated in FIG. 9):

v (i.e., downstream social value indicator for an ancestor)=union/aggregation of value assigned to an ancestor;

c (i.e., downstream cost to realize the social value indicator for an ancestor)=sum of the step costs over all the steps in the path(s) that lead to downstream social value indicator v (e.g. when computation costs or effort are not available this may be approximated as upstream distance from the initial social value indicator). Here, the cost of a downstream step is shared between overlapping paths from other ancestors directly feeding to any intermediate ancestor in the path.

p (i.e., portion of input paths to the same downstream social value indicator)=proportion of contribution vs immediate peer paths (partitions/dataset inputs) which share the downstream social value indicator (distributed by the propagation logic).

As depicted in FIG. 9, by propagating these vectors through lineage representation 900, hardware processor 812 may (1) attribute, to each ancestor, the value indicator (v) for its descendant primary analytical model; and (2) aggregate, for a given ancestor, one or more of the value indicators (v) attributed to the given ancestor. In various examples, hardware processor 812 may then reduce the attributed/aggregated value indicator for each ancestor by its downstream cost to realize (c) and/or the portion of input paths to the same downstream value (p).

Examples of the presently disclosed technology may use the propagated value indicators such as those described above in various ways. For example, they could be used when training a data analytics system to infer likely value tuples associated with recommended datasets based on their metadata characteristics. As another example, when a data analytics system generates candidate datasets and processing steps that match recommended metadata characteristics, examples can rank the candidates based on the tuples computed through this value back-propagation mechanism. For instance a simple ranking approach could sort candidates by (v) in decreasing order, (c) in increasing order and (p) in decreasing order, etc.

Referring again to FIG. 8, after propagating the value indicators for each of the one or more primary analytical models through the lineage representation, hardware processor 812 may execute instruction 822 to recommend one or more of the ancestor datasets and the ancestor processing steps for creating a prospective analytical model. Here, hardware processor 812 may recommend ancestors which have the highest aggregated value indicators after the propagation of instruction 820. As alluded to above, in various examples hardware processor 812 may recommend ancestors which have the highest aggregated value indicators after one or more reduction/discounting factors have been taken into account.

For concept illustration, referring again to FIG. 9, ancestor dataset 932 and 914 both have aggregated value indicators of $v=v1 \cup v3$. However, if these aggregated value indicators are reduced/discounted by their respective costs to realize (i.e., c=2 for ancestor dataset 932 and c=4 for ancestor dataset 914), hardware processor 812 may recommend ancestor dataset 932 over ancestor dataset 914 because it has the same aggregated value indicator with a lower cost to realize. Similarly, hardware processor 812 may recommend ancestor processing step 944 over ancestor processing step 942 because it has a higher aggregated value indicator (i.e., v3 vs v1) with the same cost to realize (i.e., c=1).

Figure 10:
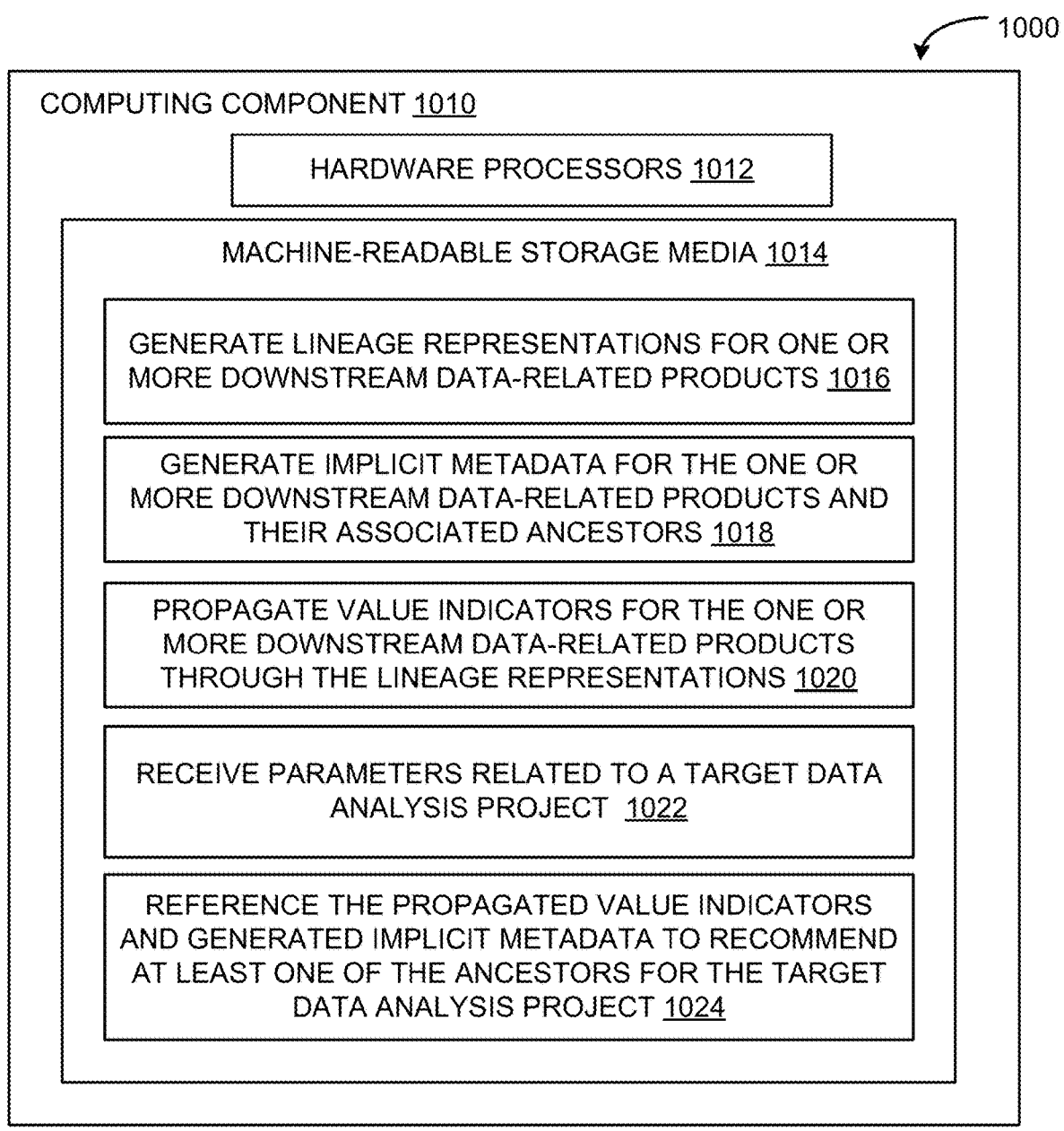
FIG. 10 depicts an example computing system that may be used to recommend data-related products for a target data analysis project, in accordance with various examples of the presently disclosed technology.

FIG. 10 depicts an example computing system 1000 that may be used to recommend data-related products for a target data analysis project, in accordance with various examples of the presently disclosed technology.

Referring now to FIG. 10, computing component 1010 may be, for example, a server computer, a controller, or any other similar computing component capable of processing data. In the example implementation of FIG. 10, the computing component 1010 includes a hardware processor 1012, and machine-readable storage medium for 1014.

Hardware processor 1012 and machine-readable storage medium 1014 may be the same/similar as hardware processor 512 and machine-readable storage medium 514 respectively. Accordingly, machine-readable storage medium 1014 may be encoded with executable instructions, for example, instructions 1016-1024.

Hardware processor 1012 may execute instruction 1016 to generate lineage representations for one or more downstream data-related products (e.g., datasets derived from upstream/ancestor data-related products and processing steps, analytical models derived from upstream/ancestor data-related products and processing steps, dashboards for displaying one or more of the foregoing data-related products, etc.). As described above, a given lineage representation for a given downstream data-related product may comprise a lineal representation between the given downstream data-related product and the given downstream data-related product's ancestor datasets and ancestor processing steps (i.e., the datasets and processing steps from which the given downstream data-related product is derived).

Hardware processor 1012 may execute instruction 1018 to generate implicit metadata for the one or more downstream data-related products and their associated ancestor processing steps and ancestor datasets. As used herein, implicit metadata may refer to data which is not created deliberately by humans (as used herein, "explicit metadata" may refer to metadata deliberately created by humans by e.g., manually tagging a data-related product with supplemental information that characterizes the data-related product). Hardware processor 1012 may generate implicit metadata using techniques such as those described in conjunction with FIG. 2. The metadata indicators described above (i.e., statistically interesting/significant correspondences perceived across metadata lineages of the downstream data-related products) may be considered examples of implicit metadata.

Hardware processor 1012 may execute instruction 1020 to propagate value indicators for each of the one or more downstream data-related products through the lineage representations. Hardware processor 1012 may execute this instruction in the same/similar manner as described in conjunction with FIGS. 8 and 9. As described above, a given value indicator may be a quantifiable measurement of a given downstream data-related product's value derived from human behavioral actions related to usage of the given downstream data-related product.

Hardware processor 1012 may execute instruction 1022 to receive parameters related to a target data analysis project. The received parameters may generally describe the target data analysis project. For example, the received parameters may specify the type of data analysis project (e.g., a project for predicting the spread of vector-borne disease in New York City) a desired type of data-related product to be utilized in the target data analysis project (e.g., a dataset or an analytical/ML model), and/or a desired metadata characteristic for a data-related product to be utilized in the target data analysis project (e.g., weekly granularity for a dataset).

Hardware processor 1012 may execute instruction 1024 to reference the propagated value indicators and generated implicit metadata to recommend at least one of the ancestor datasets for the target data analysis project.

Here, hardware processor 1012 may also recommend at least one of the ancestor processing steps as well. For example, hardware processor may recommend a first ancestor dataset (e.g., a dataset containing weekly disease prevalence by city data), a second ancestor dataset (e.g., dataset containing daily weather by city data), a first ancestor processing step (e.g., a processing step for joining/combining datasets), and a second ancestor processing step (e.g., a processing step for operationalizing datasets into analytical models). Here, the recommended first and second ancestor dataset and first and second ancestor processing step may have never been combined before. However, hardware processor 1012 may identify (via value indicator propagation through lineage representation) these ancestors as ancestors that have produced highly valued data-related products used in data analysis projects similar to the target data analysis project. Accordingly, hardware processor 1012 may determine that a novel combination of these ancestor datasets and processing steps may produce a useful/valuable new data-related product for the target data analysis project. For example, hardware processor 1012 may recommend combining/transforming the first and second ancestor datasets into a new dataset (e.g., a dataset that combines daily weather by city data with weekly disease prevalence by city data) using the first ancestor processing step. Hardware processor 1012 also may recommend transforming/operationalizing this new dataset into a new analytical model (e.g., an analytical model that predicts the spread of vector-borne disease in cities based on weather data) using the second processing step. This new analytical model may align with the received parameters for the target data analysis project.

Figure 11:
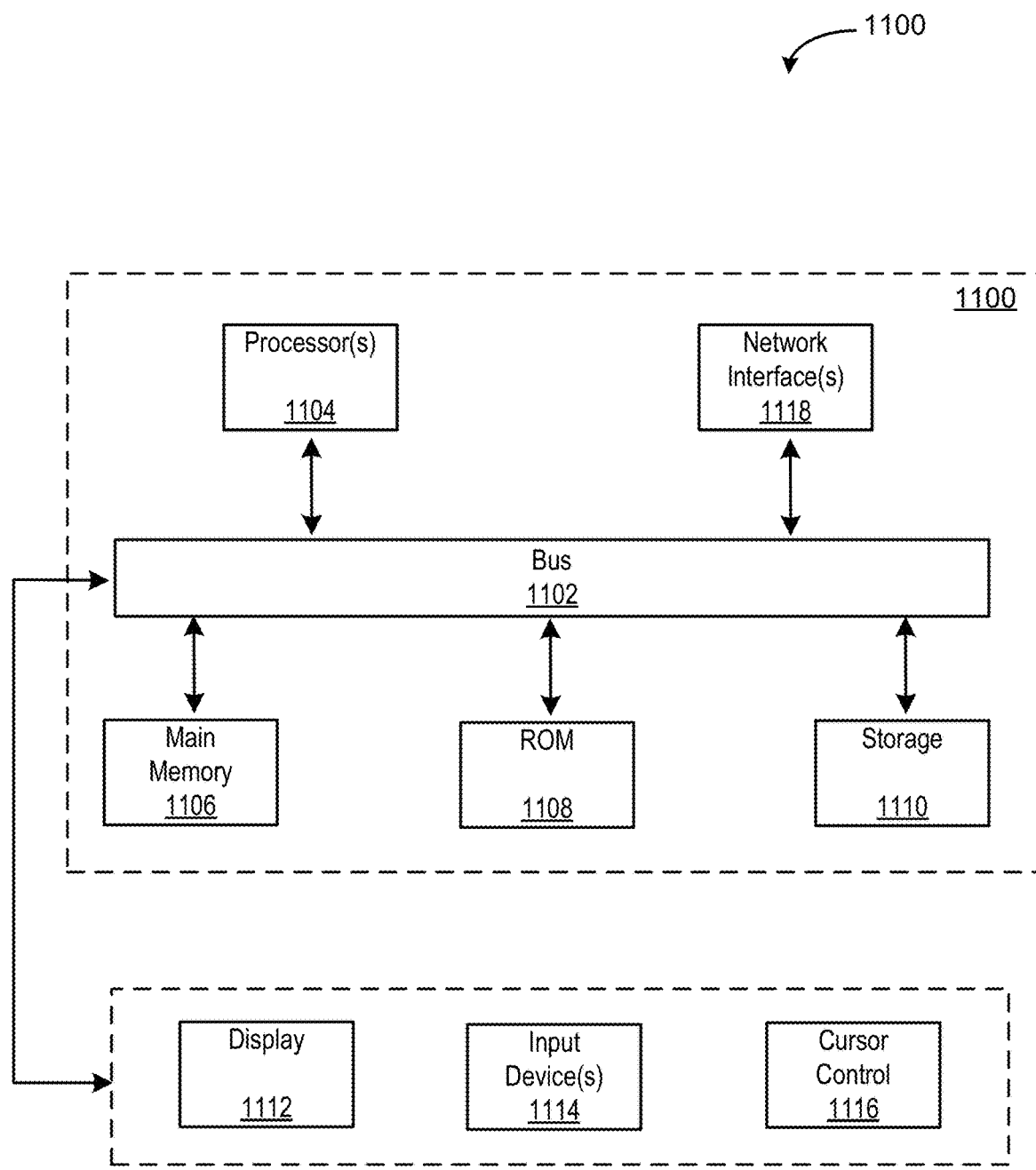
FIG. 11 depicts a block diagram of an example computer system in which various of the examples described herein may be implemented.

FIG. 11 depicts a block diagram of an example computer system 1100 in which various of the embodiments described herein may be implemented. The computer system 1100 includes a bus 1112 or other communication mechanism for communicating information, one or more hardware processors 1104 coupled with bus 1112 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1112 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1112 for storing static information and instructions for processor 1104. A storage device 1110, such as a magnetic disk, optical disk, or USB thumb drive (Flash drive), etc., is provided and coupled to bus 1112 for storing information and instructions.

The computer system 1100 may be coupled via bus 1112 to a display 1112, such as a liquid crystal display (LCD) (or touch screen), for displaying information to a computer user. An input device 1114, including alphanumeric and other keys, is coupled to bus 1112 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1112. Transmission media can also take the form of acoustic or light waves, such as those generated during radio-wave and infra-red data communications.

The computer system 1100 also includes a communication interface 1118 coupled to bus 1112. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, network interface 1118 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

As used herein, a dataset may refer to an ordered collection of data. As described above, a dataset may be a data-related product of a data processing pipeline.

As used herein, data analytics (which may be implemented using machine learning and/or artificial intelligence) may refer to techniques that make predictive determinations regarding, e.g., modeled scenarios and systems. As described above, analytical models derived from data are common data-related products of data processing pipelines.

As used herein, machine learning can refer to methods that, through the use of algorithms, are able to automatically turn datasets into analytical models. In turn, those analytical models are capable of making predictions based on patterns or inferences gleaned from other data/datasets. There has been a push to implement machine learning in enterprise environments, e.g., businesses, so that these entities may leverage machine learning to provide better services and products to their customers, become more efficient in their operations, etc. Implementing machine learning into the enterprise context, also referred to as operationalization, can involve the deployment (and management) of analytical models, i.e., putting analytical models into production.

As used herein, metadata may refer to data that provides information about other data. Within a data processing pipeline, each data-related product and processing step may have metadata associated with it. For example, metadata for a dataset may include textual documentation for the dataset, names of tables/columns/features of the dataset, descriptions of content within the dataset, data sizes within the dataset, data distributions within the dataset, etc. Examples of metadata for a processing step may include the language in which the processing step/program is written, information about input fields used for the processing step, contents of associated documentation for the processing step, class of algorithm used for the processing step, staging or quality assurance (QA) status for the processing step, names of developers/data scientists involved with the processing step, etc.

What is claimed is:

1. A system comprising:
a graphical user interface (GUI);
a data pipeline database;
one or more processing resources; and
a non-transitory computer-readable medium, coupled to the one or more processing resources, having stored therein instructions that when executed by the one or more processing resources cause the system to:
extract and characterize metadata from data processing pipelines, wherein extracting and characterizing metadata from the data processing pipelines comprises generating lineage representations for the data processing pipelines, wherein the lineage representations comprise one or more directed graphs comprising associations between a plurality of data-related products and a plurality of ancestor data-related products and processing steps from which the plurality of data-related products are derived from the plurality of ancestor data-related products;
catalog the characterized metadata;
update the lineage representations by propagating value indicators through the lineage representations for the data processing pipelines;
based on the propagation of the value indicators, identify a subset of ancestor data-related products, from the plurality of ancestor data-related products of the data processing pipelines, having highest relative value indictor;
encapsulate the updated lineage representations and characterized metadata as one or more exportable data-related packages stored to non-transitory computer-readable memory of the data pipeline database;
reference the exportable data-related packages based on a target data analysis project received via the GUI;
based on the desired characterized metadata, identify a high value-influencing metadata characteristic from the extracted metadata that arises with statistically significant frequency among the subset of ancestor data-related products having the highest relative value indicator to at least one of the generated desired metadata characteristics;
recommend, via the GUI, one or more ancestor data-related products of the subset of ancestor data-related products having the high-value influencing metadata characteristic for the target data analysis project; and
generate the target data analysis project using the recommended one or more of the ancestor data-related products.

2. The system of claim 1, wherein:
the value indicators quantify a level of value, as judged by statistical scores, for constituent data-related products of the data processing pipelines based on human behavioral actions associated with the constituent data-related products.

3. The system of claim 1, wherein:
a metadata enricher module, associated with a processing resource of the one or more processing resources, extracts and characterizes the metadata from the data processing pipelines;
a value indicator propagator module, associated with a second processing resource of the one or more processing resources, propagates the value indicators through the lineage representations for the data processing pipelines; and
a data pipeline catalog and recommender module, associated with a third processing resource of the one or more processing resources, catalogs the characterized metadata and recommends the one or more data-related products having the high-value influencing metadata characteristic for the target data analysis project.

4. The system of claim 3, wherein the metadata enricher module uses metadata enricher pipelines to generate implicit metadata for constituent data-related products of the data processing pipelines.

5. The system of claim 4, wherein generating the implicit metadata for the constituent data-related products of the data processing pipelines comprises analyzing and extracting mathematical properties of metadata values associated with the constituent data-related products.

6. The system of claim 4, wherein generating the implicit metadata for the constituent data-related products of the data processing pipelines comprises analyzing and characterizing statistical distributions for the constituent data-related products.

7. The system of claim 4, wherein generating the implicit metadata for the constituent data-related products of the data processing pipelines comprises attributing metadata indicators to the constituent data-related products, wherein the metadata indicators comprise statistically significant correspondences, as judged by statistical scores, across metadata lineages for the constituent data-related products.

8. The system of claim 1, wherein recommending the one or more data-related products for the target data analysis project comprises recommending an existing processing step to transform an existing dataset into a new data-related product, wherein the existing processing step and the existing dataset are constituent data-related products of the data processing pipelines.

9. The system of claim 1, wherein cataloging the extracted metadata comprises generating and cataloging exportable data-related packages associated with the data processing pipelines.

10. The system of claim 9, wherein the exportable data-related packages comprise at least one of:
an exportable data-related package that encapsulates metadata associated with a constituent data-related product of the data processing pipelines; and
an exportable data-related package that encapsulates metadata associated with a data processing pipeline of the data processing pipelines.

11. The system of claim 10, wherein the constituent data-related product comprises at least one of a dataset, a processing step, and an analytical model.

12. The system of claim 9, wherein the exportable data-related packages are catalogued based on at least one of:
extracted metadata;
value indicators attributed to data-related products associated with the exportable data-related packages; and
metadata indicators attributed to the data-related products associated with the exportable data-related packages.

13. The system of claim 9, wherein the exportable data-related packages are indexed in a catalog that includes a search engine that serves recommendations.

14. A method comprising:
extracting and characterizing metadata from data processing pipelines, wherein extracting and characterizing the metadata from the data processing pipelines comprises generating lineage representations for the data processing pipelines, wherein the lineage representations comprise one or more directed graphs comprising associations between a plurality of data-related products and a plurality of ancestor data-related products and processing steps from which the plurality of data-related products are derived from the plurality of ancestor data-related products;
cataloging the extracted metadata from the data processing pipelines;
updating the lineage representations by propagating value indicators through the lineage representations for the data processing pipelines;
based on the propagation of the value indicators, identifying a subset of ancestor data-related products, from the plurality of ancestor data-related products of the data processing pipelines, having highest relative value indictor;
encapsulating the updated lineage representations and characterized metadata as one or more exportable data-related packages stored to non-transitory computer-readable memory of the data pipeline database;
referencing the exportable data-related packages based on a target data analysis project received via the GUI;
based on the desired characterized metadata, identifying a high value-influencing metadata characteristic from the extracted metadata that arises with statistically significant frequency among the subset of ancestor data-related products having the highest relative value indicator to at least one of the generated desired metadata characteristics;
recommending, via the GUI, one or more ancestor data-related products of the subset of ancestor data-related products having the high-value influencing metadata characteristic for the target data analysis project; and
generating the target data analysis project using the recommended one or more of the ancestor data-related products.

15. The method of claim 14, wherein:
the value indicators quantify a level of value, as judged by statistical scores, for constituent data-related products of the data processing pipelines based on human behavioral actions associated with the constituent data-related products.

16. The method of claim 14, wherein extracting and characterizing the metadata for the data processing pipeline comprises generating implicit metadata for constituent data-related products of the data processing pipelines.

17. The method of claim 16, wherein generating the implicit metadata for the constituent data-related products of the data processing pipelines comprises at least one of:
analyzing and characterizing mathematical properties of metadata values associated with the constituent data-related products;
analyzing and characterizing statistical distributions for the constituent data-related products; and
attributing metadata indicators to the constituent data-related products, wherein the metadata indicators comprise statistically significant correspondences, as judged by statistical scores, across metadata lineages for the constituent data-related products.

18. The method of claim 14, wherein recommending one or more data-related products comprises recommending to transform an existing dataset using an existing processing step from the data processing pipelines to produce a new data-related product.

19. The method of claim 14, wherein:
cataloging the extracted metadata from the data processing pipelines comprises generating and cataloging exportable data-related packages associated with the data processing pipelines; and
the exportable data-related packages comprise at least one of:
an exportable data-related package that encapsulates metadata associated with a constituent data-related product of the data processing pipelines; and
an exportable data-related package that encapsulates metadata associated with a data processing pipeline of the data processing pipelines.

20. A non-transitory computer-readable medium storing instructions, which when executed by one or more processing resources, cause the one or more processing resources to:
generate lineage representations for data processing pipelines by extracting and characterizing metadata from data processing pipelines, wherein extracting and characterizing metadata from the data processing pipelines comprises generating lineage representations for the data processing pipelines, wherein the lineage representations comprise one or more directed graphs comprising associations between a plurality of data-related products and a plurality of ancestor data-related products and processing steps from which the plurality of data-related products are derived from the plurality of ancestor data-related products;
update the lineage representations by propagating value indicators through lineage representations for the data processing pipelines based on the propagation of the value indicators, identify a subset of ancestor data-related products, from the plurality of ancestor data-related products of the data processing pipelines, having highest relative value indictor;
encapsulate the updated lineage representations and characterized metadata as one or more exportable data-related packages stored to non-transitory computer-readable memory of the data pipeline database;
reference the exportable data-related packages based on a target data analysis project received via the GUI;
based on the desired characterized metadata, identify a high value-influencing metadata characteristic from the extracted metadata that arises with statistically significant frequency among the subset of ancestor data-related products having the highest relative value indicator to at least one of the generated desired metadata characteristics;
recommend, via the GUI, one or more ancestor data-related products of the subset of ancestor data-related products having the high-value influencing metadata characteristic for the target data analysis project; and
generate the target data analysis project using the recommended one or more of the ancestor data-related products.

* * * * *